(12) United States Patent
Schmidt et al.

(10) Patent No.: US 9,902,869 B2
(45) Date of Patent: Feb. 27, 2018

(54) METHODS OF LAYER BY LAYER SELF-ASSEMBLY OF POLYELECTROLYTE COMPRISING LIGHT ABSORBING OR STABILIZING COMPOUND AND ARTICLES

(71) Applicant: 3M INNOVATIVE PROPERTIES COMPANY, St. Paul, MN (US)

(72) Inventors: Daniel J. Schmidt, Woodbury, MN (US); Richard S. Buckanin, Woodbury, MN (US); Timothy J. Hebrink, Scandia, MN (US); James R. Miller, Hudson, WI (US)

(73) Assignee: 3M Innovative Properties Company, St. Paul, MN (US)

(*) Notice: Subject to any disclaimer, the term of this patent is extended or adjusted under 35 U.S.C. 154(b) by 160 days.

(21) Appl. No.: 14/782,125

(22) PCT Filed: Apr. 14, 2014

(86) PCT No.: PCT/US2014/033933
§ 371 (c)(1),
(2) Date: Oct. 2, 2015

(87) PCT Pub. No.: WO2014/193550
PCT Pub. Date: Dec. 4, 2014

(65) Prior Publication Data
US 2016/0068703 A1    Mar. 10, 2016

Related U.S. Application Data

(60) Provisional application No. 61/829,332, filed on May 31, 2013.

(51) Int. Cl.
| | | |
|---|---|---|
| *C09D 139/00* | (2006.01) | |
| *C09D 5/00* | (2006.01) | |
| *B05D 5/06* | (2006.01) | |
| *B05D 7/04* | (2006.01) | |
| *C03C 17/42* | (2006.01) | |
| *C08K 3/22* | (2006.01) | |
| *B05D 7/00* | (2006.01) | |
| *C09D 133/14* | (2006.01) | |
| *C08F 226/04* | (2006.01) | |
| *C08L 33/00* | (2006.01) | |

(52) U.S. Cl.
CPC .......... *C09D 139/00* (2013.01); *B05D 5/061* (2013.01); *B05D 5/063* (2013.01); *B05D 7/04* (2013.01); *B05D 7/56* (2013.01); *C03C 17/42* (2013.01); *C08K 3/22* (2013.01); *C09D 5/00* (2013.01); *C09D 133/14* (2013.01); *C03C 2217/48* (2013.01); *C03C 2217/74* (2013.01); *C03C 2217/78* (2013.01); *C08F 226/04* (2013.01); *C08K 2003/2241* (2013.01); *C08L 33/00* (2013.01)

(58) Field of Classification Search
CPC ...... C09D 139/00; C09D 5/00; C09D 133/14;
B05D 5/061; B05D 5/063; B05D 7/04;
B05D 7/56; C03C 17/42; C03C 2217/48;
C03C 2217/74; C03C 2217/78; C08K
3/22; C08K 2003/2241; C08L 33/00
USPC .......................................................... 428/522
See application file for complete search history.

(56) References Cited

U.S. PATENT DOCUMENTS

| | | |
|---|---|---|
| 3,247,392 A | 4/1966 | Thelen |
| 4,864,016 A | 9/1989 | DuPont |
| 5,126,394 A | 6/1992 | Revis |
| 5,540,978 A | 7/1996 | Schrenk |
| 5,882,774 A | 3/1999 | Jonza |
| 6,251,521 B1 * | 6/2001 | Eian ..................... C08F 265/04 428/402.21 |
| 6,316,084 B1 | 11/2001 | Claus |
| 6,352,761 B1 | 3/2002 | Hebrink |
| 6,376,590 B2 | 4/2002 | Kolb |
| 6,449,093 B2 | 9/2002 | Hebrink |
| 6,783,349 B2 | 8/2004 | Neavin |
| 6,953,607 B2 | 10/2005 | Cott |
| 7,153,588 B2 | 12/2006 | McMan |
| 7,258,924 B2 | 8/2007 | Cott |
| 7,345,137 B2 | 3/2008 | Hebrink |
| 8,234,998 B2 | 8/2012 | Krogman |
| 8,277,899 B2 | 10/2012 | Krogman |
| 8,313,798 B2 | 11/2012 | Nogueira |

(Continued)

FOREIGN PATENT DOCUMENTS

| | | |
|---|---|---|
| CN | 1861655 | 11/2006 |
| EP | 2393124 | 12/2011 |

(Continued)

OTHER PUBLICATIONS

"CibaTinuvin-R-796 Reactable UV Absorber", Ciba Specialty Chemicals, Jul. 2001, pp. 1-3.

(Continued)

*Primary Examiner* — Michael M Bernshteyn
(74) *Attorney, Agent, or Firm* — Carolyn A. Fischer

(57) ABSTRACT

Methods of protecting a substrate from light-induced degradation are described. The methods comprise providing a substrate and disposing onto the substrate a plurality of layers deposited by layer-by-layer self-assembly. At least a portion of the layers comprise an organic light absorbing compound, an organic light stabilizing compound, or a combination thereof dispersed within a polyelectrolyte. Also described are articles comprising a substrate and a plurality of layers deposited by layer-by-layer self-assembly wherein at least a portion of the layers comprise an organic light absorbing compound, an organic light stabilizing compound, or a combination thereof dispersed within a polyelectrolyte. Random copolymers suitable for use in the method and articles are also described.

28 Claims, 6 Drawing Sheets

(56) References Cited

U.S. PATENT DOCUMENTS

| | | | |
|---|---|---|---|
| 2004/0023824 A1 | 2/2004 | Züechner | |
| 2004/0157047 A1 | 8/2004 | Mehrabi | |
| 2006/0084780 A1 | 4/2006 | Hebrink | |
| 2006/0148950 A1 | 7/2006 | Davidson | |
| 2009/0283144 A1 | 11/2009 | Hebrink | |
| 2010/0003499 A1 | 1/2010 | Krogman | |
| 2010/0014366 A1 | 1/2010 | Nam | |
| 2010/0075136 A1 | 3/2010 | Song | |
| 2010/0290109 A1 | 11/2010 | Kurt | |
| 2011/0064936 A1 | 3/2011 | Hammond-Cunningham | |
| 2011/0076504 A1 | 3/2011 | Van De Weerdt | |
| 2011/0086232 A1* | 4/2011 | Sharma | C03C 17/42 428/432 |
| 2011/0297221 A1* | 12/2011 | Jeong | H01L 31/0481 136/256 |
| 2012/0011850 A1 | 1/2012 | Hebrink | |
| 2012/0148829 A1 | 6/2012 | Krogman | |
| 2012/0156389 A1* | 6/2012 | Kotov | B05D 1/185 427/532 |
| 2013/0112263 A1* | 5/2013 | Agarwal | H01L 31/0296 136/256 |

FOREIGN PATENT DOCUMENTS

| | | | |
|---|---|---|---|
| WO | WO 1999-35520 | 7/1999 | |
| WO | WO 2007-053772 | 5/2007 | |
| WO | WO 2009-140493 | 11/2009 | |
| WO | WO 2010-059416 | 5/2010 | |
| WO | WO 2010-075161 | 7/2010 | |
| WO | WO 2010-078105 | 7/2010 | |
| WO | WO 2010-078289 | 7/2010 | |
| WO | WO 2011-026104 | 3/2011 | |
| WO | WO 2011-062836 | 5/2011 | |
| WO | WO 2011062836 A1 * | 5/2011 | G02B 1/04 |
| WO | WO 2012-015989 | 2/2012 | |
| WO | WO 2012-112624 | 8/2012 | |
| WO | WO 2013-142239 | 9/2013 | |
| WO | WO 2014-099367 | 6/2014 | |
| WO | WO 2014-100551 | 6/2014 | |
| WO | WO 2014100551 A1 * | 6/2014 | C08F 220/22 |

OTHER PUBLICATIONS

Basarir, "Sonication-assisted layer-by-layer deposition of gold nanoparticles for highly conductive gold patterns", "Ultrasonics Sonochemistry", 2012, vol. 19, pp. 621-626.

Berg, "Self-assembled nanostructured multilayered spectral filters", "Proceedings of SPIE", Mar. 16, 2006, vol. 6172, pp. 61720W-1-61720W-5.

Bucatariu, "Single polyelectrolyte multilayers deposited onto silica microparticles and silicon wafers", Colloids and Surfaces A: Physicochem. Eng. Aspects, 2011, vol. 380, pp. 111-118.

Cebeci, "Nanoporosity-Driven Superhydrophilicity : A Means to Create Multifunctional Antifogging Coatings", Langmuir, 2006, vol. 22, No. 6, pp. 2856-2862.

Cheng, "Preparation of the layer-by-layer deposited silver nanoparticles multilayer films on poly(ethylene Terephalate) substrate", Advanced Study Materials,. 2011, vol. 189-193, pp. 1362-1365.

Choi, "Multilayer Thin Films by Layer-by-Layer Assembly of Hole- and Electron-Transport Polyelectrolytes:Optical and Electrochemical Properties", Micromolecular Chemistry and Physics, 2006, vol. 207, pp. 1870-1879.

Dawidczyk, "Layer-by-layer assembly of UV-resistant poly(3,4-ethylenedioxythiophene) thin films",. Langmuir, 2008, vol. 24, pp. 8314-8318.

Decher, "Fuzzy Nanoassemblies:Toward Layered Polymeric Multicomposites", Science, Aug. 1997, vol. 277, pp. 1232-1237.

Eby, "Bacterial sunscreen: Layer-by-layer deposition of UV-absorbing polymers on whole-cell biosensors",. Langmuir, 2012, vol. 28, pp. 10521-10527.

Eita, "Thin Films of Zinc Oxide Nanoparticles and Poly(acrylic acid) Fabricated by the Layer-by-Layer Technique: a Facile Platform for Outstanding Properties", The Journal of Physical Chemistry C, 2012, vol. 116,pp. 4621-4627.

Fu, "Facile and Efficient Approach to Speed up Layer-by-Layer Assembly: Dipping in Agitated Solutions", Langmuir, 2011 vol. 27, No. 2, pp. 672-677.

Fujimoto, "Self-Assembled Nano-heterostructural Thin Film for Optical Lens", Japanese Journal of Applied Physics, 2011, vol. 50, pp. 045803.

Fujimoto, "Fabrication of Layer-by-Layer Self-Assembly Films Using Roll-to-Roll Process", Japanese Journal of Applied Physics, 2005, vol. 44, No. 3, pp. L126-L128.

Iamphaojeen, "Immobilization of zinc oxide nanoparticles on cotton fabrics using poly 4-styrenesulfonic acid polyelectrolyte", International Journal of Materials Research, 2012, vol. 103, No. 5, pp. 643-647.

Iler, "Multilayers of colloidal particles", Journal of Colloid and Interface Science,1966, vol. 21, pp. 569-594.

Izquierdo, "Dipping versus Spraying: Exploring the Deposition Conditions for Speeding Up Layer-by-Layer Assembly",. Langmuir, 2005,.vol. 21, pp. 7558-7567.

Ji, "Stimuli-free auto-modulated material release from mesoporous nanocompartment films", "Journal of the American Chemical Society", 2008, vol. 130, pp. 2376-2377.

Krogman, "Automated Process for Improved Uniformity and Versatility of Layer-by-Layer Deposition", Langmuir, 2007, vol. 23, pp. 3137-3141.

Kurt, "Structural color via layer-by-layer deposition: layered nanoparticle arrays with near-UV and visible reflectivity bands", Journal of Materials Chemistry, 2009, vol. 19, No. 47, pp. 8920-8927.

Lehaf, "Correlating the Compliance and Permeability of Photo-Cross-Linked Polyelectrolyte Multilayers", Langmuir, 2011, vol. 27, pp. 4756-4763.

Liu, "Calcium-doped ceria/titanate tabular functional nanocomposite by layer-by-layer coating method",. Journal of Solid State Chemistry, 2010, No. 183, pp. 1545-1549.

Liu, "Layer-by-layer self-assembly of TiO 2 sol on wool to improve its anti-ultraviolet and anti-ageing properties", Journal of Sol-Gel Science and Technology, 2012, vol. 62, pp. 338-343.

Lvov, "Converting Poorly Soluble Materials into Stable Aqueous Nanocolloids", Langmuir, 2011, vol. 27, No. 3, pp. 1212-1217.

Niemiec, "Nanoheterogeneous multilayer films with perfluorinated domains fabricated using the layer-by-layer method", Langmuir, 2010, vol. 26, No. 14, pp. 11915-11920.

Noguira, "Spray-Layer-by-Layer Assembly Can More Rapidly Product Optical-Quality Multilayer Heterostructures", Langmuir, 2011, vol. 27, pp. 7860-7867.

Park, "Sustained Release Control Via Photo—Cross Linking of polyelectrolyete Layer-by-Layer Hollow Capsules", Langmuir, 2005, vol. 21, pp. 5272-5277.

Park, "pHSensitive Bipolar Ion Permselective Ultra-thin Films", Journal on American Chemical Society, 2004, vol. 126, pp. 13721-13723.

Schaaf, "Spray-Assisted Polyelectrolyte Multilayer Buildup: from Step-by-Step to Single-Step Polyelectrolyte Film Constructions", Advanced Materials, 2012, vol. 24, pp. 1001-1016.

Schlenof, "Sprayed Polyelectrolyte Multilayers", Langmuir, 2000, vol. 16, pp. 9668-9969.

Svehla, "Polyester Preparation in the Presence of Pristine and Phosphonic-Acid-odified Zirconia Nanopowders", Molecular Materials and Engineering, 2012, vol. 297, pp. 219-227.

Ugur, "Modifying of Cotton Fabric Surface with Nano-ZnO Multilayer Films by Layer-by-Layer Deposition Method", Nanoscale research letters, 2010, pp. 1204-1210.

Ugur, "Nano TiO2 Based Multilayer Film Deposition on Cotton Fabrics for UV Protection", Fibers and Polymers, 2011, pp. 190-196.

Van-Cott,"Characterization of the purity and stability of commercially available dichlorotriazine chromophores used in nonlinear optical materials", Dyes and Pigments, 2003, vol. 58, pp. 145-155.

(56) References Cited

OTHER PUBLICATIONS

Volodkin, "Matrix Polyelectrolyte Microcapsules: New System for Macromolecule Encapsulation", Langmuir, 2004, vol. 20, pp. 3398-3406.
Wang, "Developing a novel UV protection process for cotton based on layer-by-layer self-assembly", Carbohydrate Polymers, 2010, vol. 81, pp. 491-496.
Wang, "Transparent nanostructured coatings with UV-shielding and superhydrophobicity properties", Nanotechnology, 2011, vol. 22, p. 265708.
Wu, "Structural Color in Porous, Superhydrophilic, and Self-Cleaning SiO2/TiO2 Bragg Stacks", Small, 2007, vol. 3, No. 8, pp. 1445-1451.
Yi, UV-Cross-Linkable Multilayer Microcapsules Made of Weak Polyectrolytes, Langmuir, 2012, No. 28, pp. 10822-10829.
International Search Report for PCT International Application No. PCT/US2014/033933, dated Oct. 15, 2014, 4pgs.

\* cited by examiner

METHODS OF LAYER BY LAYER SELF-ASSEMBLY OF POLYELECTROLYTE COMPRISING LIGHT ABSORBING OR STABILIZING COMPOUND AND ARTICLES

BACKGROUND

Solar light, and in particular ultraviolet radiation (UV), can induce degradation of organic materials such as polymeric films and coatings. Degradation can result in color change as well as deterioration of optical (e.g. formation of haze) and mechanical properties Inhibition of photo-oxidative degradation is important for outdoor applications wherein long term durability is mandatory. The absorption of UV-light by polyethylene terephthalates, for example, starts at around 360 nm, increases markedly below 320 nm, and is very pronounced at below 300 nm. Polyethylene naphthalates strongly absorb UV-light in the 310-370 nm range, with an absorption tail extending to about 410 nm, and with absorption maxima occurring at 352 nm and 337 nm. Chain cleavage occurs in the presence of oxygen, and the predominant photooxidation products are carbon monoxide, carbon dioxide, and carboxylic acids. Besides the direct photolysis of the ester groups, consideration has to be given to oxidation reactions, which likewise form carbon dioxide via peroxide radicals. In addition to degradation caused by ultra-violet light, polymers (e.g., PEN (polyethylenenaphthalate) can degrade from exposure to blue light in the wavelength range of 400 nm to 490 nm.

Thus, industry would find advantage in new methods of protecting substrates from light-induced degradation.

SUMMARY

In some embodiments, a method of protecting a substrate from light-induced degradation is described. The method comprises providing a substrate and disposing onto the substrate a plurality of layers deposited by layer-by-layer self-assembly. At least a portion of the layers comprise an organic light absorbing compound, an organic light stabilizing compound, or a combination thereof dispersed within a polyelectrolyte.

In one embodiment, the substrate comprises an organic material, such as an organic polymeric film or inorganic substrate (e.g. glass) comprising an organic polymeric coating.

In another embodiment, the substrate may comprise an organic or inorganic material. In this embodiment, the method comprises disposing onto the substrate a plurality of alternating layers of a polyelectrolyte and inorganic oxide nanoparticles deposited by layer-by-layer self-assembly wherein at least a portion of the layers comprise an organic light absorbing compound, an organic light stabilizing compound, or a combination thereof dispersed within the polyelectrolyte.

In other embodiments, articles are described comprising a substrate and a plurality of layers deposited by layer-by-layer self-assembly wherein at least a portion of the layers comprise an organic light absorbing compound, an organic light stabilizing compound, or a combination thereof dispersed within a polyelectrolyte.

Also described are random copolymers suitable for use in the method and articles. The random copolymers comprise repeat units derived from an ionic monomer comprising a (meth)acryl or vinyl ether group and at least one organic light absorbing or light stabilizing compound comprising a (meth)acryl or vinyl group.

DETAILED DESCRIPTION

Figure 1:
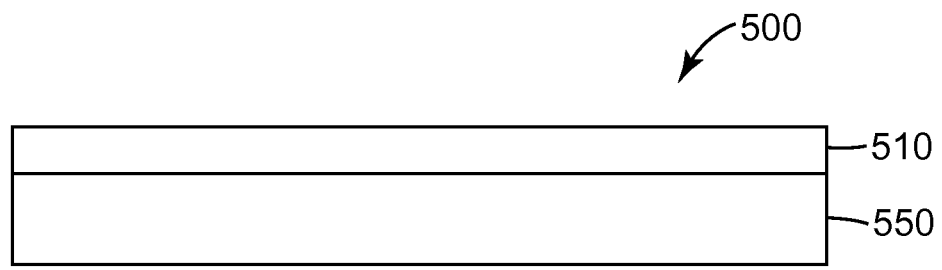
FIG. 1 is a cross sectional view of an illustrative article 500 comprising a substrate 550 and a plurality of layers deposited by layer-by-layer self-assembly 510, disposed on substrate 550.

As used in this application:

"polymer" means organic polymers and copolymers (i.e., polymers formed from two or more monomers or comonomers, including terpolymers, for example), as well as copolymers or polymers that can be formed in a miscible blend by, for example, coextrusion or reaction, including transesterification, for example. Block, random, graft, and alternating polymers are included;

"polyelectrolyte" means an organic polymer with multiple ionic groups capable of electrostatic interaction. "Strong polyelectrolytes" possess permanent charges across a wide range of pH (e.g., polymers containing quaternary ammonium groups or sulfonic acid groups). "Weak polyelectrolytes" possess a pH-dependent level of charge (e.g. polymers containing primary, secondary, or tertiary amines, or carboxylic acids);

"(meth)acryl" refers to methacrylate, methacrylamide, acrylate, or acrylamide;

"index of refraction", also referred to as "index" or "RI", refers to a refractive index of a material in the plane of the material with respect to light at 633 nm and normal or near normal (i.e. 8 degrees) incidence, unless otherwise indicated;

"high refractive index" and "low refractive index" are relative terms; when two layers are compared in both in-plane directions of interest, the layer that has a greater average in-plane refractive index is the high refractive index layer, and the layer that has a lower average in-plane refractive index is the low refractive index layer;

"birefringent" means that the indices of refraction in orthogonal x, y, and z directions are not all the same. Index of refraction is designated as $n_x$, $n_y$, and $n_z$ for x, y, and z directions, respectively. For the polymer layers described herein, the axes are selected so that x and y axes are in the plane of the layer and the z axis is normal to the plane of the layer and typically corresponds to the thickness or height of the layer. Where a refractive index in one in-plane direction is larger than a refractive index in another in-plane direction, the x-axis is generally chosen to be the in-plane direction with the largest index of refraction, which sometimes corresponds to one of the directions in which the optical film is oriented (e.g., stretched). Birefringence values are expressed herein with respect to light at 633 nm and normal incidence, unless otherwise indicated;

"in-plane birefringence, $\Delta n_{in}$," of a uniaxially stretched film concerns the difference of the indices ($n_x$ and $n_y$) in the orthogonal in-plane directions. More specifically for a uniaxially stretched film, in-plane birefringence refers to the difference between the stretching direction and the non-stretching direction. For example, assuming a film is uniaxially stretched in the machine direction (MD), the in-plane birefringence is expressed as the following:

$$\Delta n_{in} = n_x - n_y$$

where $n_x$ is the refractive index in the stretching direction (in this case, MD), and $n_y$ is the refractive index in the non-stretching direction (in this case, transverse direction (TD)). For a biaxially stretched film, the in-plane birefringence is relatively small and sometimes close to zero if balanced. Instead, out-of-plane birefringence is more indicative of the birefringent nature of the stretched film;

"out-of-plane birefringence, $\Delta n_{out}$" of a biaxially oriented film, concerns the difference between average of in-plane indices ($n_x$ and $n_y$) and the index normal to the film ($n_z$). Out-of-plane birefringence can be expressed as the following:

$$\Delta n_{out} = \frac{(n_x + n_y)}{2} - n_z$$

where $n_x$ is RI in MD and $n_y$ is RI in TD and $n_z$ is RI normal to the film. Out-of-plane birefringence can also be used to measure the birefringent nature of uniaxially stretched films;

"reflectivity" refers to reflectivity at normal incidence which is understood to include slight deviations from 90 degrees (e.g. 8 degree deviation) unless specified otherwise.

Unless specified otherwise, a bandwidth refers to any increment of at least 10 nm of electromagnetic radiation between 290 nm and 1100 nm. A bandwidth may also be greater than 10 nm such as 25 nm, 50 nm, or 100 nm. As used herein, visible light refers to the bandwidth from 400 nm to 700 nm; ultraviolet refers to the bandwidth 290 to 400 nm; UV-blue is the bandwidth from 350 to 490 nm; and near infrared refers to the bandwidth from 870 to 1100 nm.

With reference to FIG. 1, an illustrative article 500 generally comprises a substrate 550 and a plurality of layers 510 deposited by layer-by-layer self-assembly disposed on the substrate 550. At least a portion of the layers comprise an organic light absorbing compound, an organic light stabilizing compound, or a combination thereof dispersed within a polyelectrolyte. Although FIG. 1 depicts the plurality of layers deposited by layer-by-layer self-assembly on a single major surface, in another embodiment both major surfaces of substrate 550 can comprise a plurality of layers 510 deposited by layer-by-layer self-assembly.

In some embodiments, the substrate is typically a (e.g. non-porous) plate or continuous film having a thickness of at least 20, 30, 40, or 50 microns to 1, 2, 3, 4, or 5 cm. In more typical embodiments, the thickness of the substrate is no greater than 30, 20, or 10 mm. Further, thinner substrates may be employed for embodiments wherein the substrate is reinforced by a carrier such as a removable release liner.

Although the method is suitable for any type of substrate, the method is particularly advantageous for substrates comprising an organic material, since organic materials are highly susceptible to light-induced degradation.

In some favored embodiments, substrate 550 comprises an organic material, such as an organic polymeric film or a woven or (e.g. melt blown, spunbond, or carded) nonwoven polymeric material. Suitable synthetic fibers can be made from polyvinyl chloride, polyvinyl fluoride, polytetrafluoroethylene, polyvinylidene chloride, polyacrylics, polyvinyl acetate, polyethylvinyl acetate, non-soluble or soluble polyvinyl alcohol, polyolefins such as polyethylene and polypropylene, polyamides such as nylon, polyesters, polyurethanes, polystyrenes, multi-component fibers and the like. In some embodiments, the synthetic fibers are thermoplastic, e.g. having a melt point of at least 50° C.-75° C. less and no greater than 190 or 175° C.

Suitable organic (e.g. film, woven and non-woven) polymeric materials include homopolymers, copolymers, blends, multilayer films, and multilayer laminates of any polymeric materials including for example polyester (e.g., polyethylene terephthalate, polybutylene terephthalate, and polyethylene napthalate), polycarbonate, allyldiglycol carbonate, acrylics (e.g., polymethylmethacrylate (PMMA)), polystyrene, polysulfone, polyether sulfone, homo-epoxy polymers, epoxy addition polymers with polydiamines and/or polydithiols, polyamides (e.g., nylon 6 and nylon 6,6), polyimides, polyolefins (e.g., polyethylene and polypropylene), olefinic copolymers (e.g., polyethylene copolymers), polyurethanes, polyureas, cellulose esters (e.g., cellulose acetate, cellulose triacetate, and cellulose butyrate), fluoropolymers, and combinations thereof.

Figure 2:
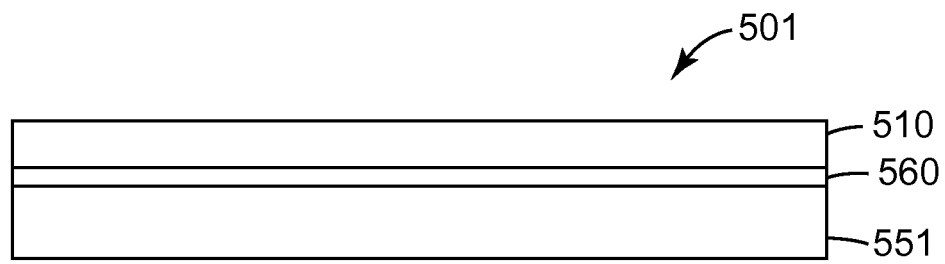
FIG. 2 is a cross sectional view of an illustrative article 501 comprising a substrate 551 including a coating 560 and a plurality of layers deposited by layer-by-layer self-assembly 510, disposed on coating 560.

Another example of a substrate comprising an organic material is depicted in FIG. 2. In this embodiment, substrate 551 may comprise an organic material or may consist of an inorganic material, such as glass or metal. Substrate 551 further comprises an organic polymeric coating 560. In this embodiment, the plurality of layers deposited by layer-by-layer self-assembly 510 are disposed onto the polymeric coating 560. The polymeric coating 560 typically has a thickness of at least 5 or 10 microns and may range up to 100 microns.

Inorganic substrates include for example insulators/dielectrics, semiconductors, or conductors. Inorganic substrates (e.g. dielectrics) can be amorphous or crystalline and include, for example, glass (e.g. float glass, soda lime glass, borosilicate glass), quartz, fused quartz, sapphire, yttria, and other transparent ceramics. Inorganic substrates (e.g. semiconductors) include for example silicon, germanium, Group III/Group V semiconductors (e.g. gallium arsenide) Group II/VI semiconductors, Group IV/VI semiconductors, or Group IV semiconductors (e.g. silicon carbide). Inorganic substrates (e.g. conductors) include for example transparent conductive oxides (TCOs) such as indium-doped tin oxide (ITO), fluorine-doped tin oxide (FTO), and aluminum-doped zinc oxide (AZO) or metals such as gold, silver, aluminum, copper, iron, or alloys such as stainless steel.

The polymeric coating can comprise any of the previously described organic polymeric materials. The polymeric coating can be aqueous-based, solvent-based, or a radiation curable (e.g. 100% solids) coating comprising a polymerizable resin. The polymerizable resin may comprises various (meth)acryl monomer and/or oligomers. The polymeric coating can comprise conducting polymers (e.g. polyaniline or poly(3,4 ethylenedioxythiophene): poly(styrene sulfonate)). The polymeric coating could also be filled with nano- or microparticles of inorganic material (e.g. inorganic oxides such as nanosilica, clay, etc.). The polymeric coating can be, for example, a protective coating, a structural coating, a hardcoat, an anti-reflection coating, or a selectively reflective coating (e.g. visible reflector, UV reflector, IR reflector, or combination thereof).

The plurality of layers disposed on the substrate or coating comprise at least two layers deposited by what is commonly referred to as a "layer-by-layer self-assembly process". This process is commonly used to assemble films or coatings of oppositely charged polyelectrolytes electrostatically, but other functionalities such as hydrogen bond donor/acceptors, metal ions/ligands, and covalent bonding moieties can be the driving force for film assembly. Typically, this deposition process involves exposing the substrate having a surface charge, to a series of liquid solutions, or baths. This can be accomplished by immersion of the substrate into liquid baths (also referred to as dip coating), spraying, spin coating, roll coating, inkjet printing, and the like. Exposure to the first polyion (e.g. polyelectrolyte bath) liquid solution, which has charge opposite that of the substrate, results in charged species near the substrate surface adsorbing quickly, establishing a concentration gradient, and drawing more polyelectrolyte from the bulk solution to the surface. Further adsorption occurs until a sufficient layer has developed to mask the underlying charge and reverse the net charge of the substrate surface. In order for mass transfer and adsorption to occur, this exposure time is typically on the order of minutes. The substrate is then removed from the first polyion (e.g. bath) liquid solution, and is then exposed to a series of water rinse baths to remove any physically entangled or loosely bound polyelectrolyte. Following these rinse (e.g. bath) liquid solutions, the substrate is then exposed to a second polyion (e.g. polyelectrolyte or inorganic oxide nanoparticle bath) liquid solution, which has charge opposite that of the first polyion (e.g. bath) liquid solution. Once again adsorption occurs, since the surface charge of the substrate is opposite that of the second (e.g. bath) liquid solution. Continued exposure to the second polyion (e.g. bath) liquid solution then results in a reversal of the surface charge of the substrate. A subsequent rinsing can be performed to complete the cycle. This sequence of steps is said to build up one layer pair, also referred to herein as a "bi-layer" of deposition and can be repeated as desired to add further layer pairs to the substrate.

Some examples of suitable processes include those described in Krogman et al., U.S. Pat. No. 8,234,998; Hammond-Cunningham et al., US2011/0064936; and Nogueira et al., U.S. Pat. No. 8,313,798. Further layer-by layer dip coating can be conducted using a StratoSequence VI (nanoStrata Inc., Tallahassee, Fla.) dip coating robot.

Figure 3:
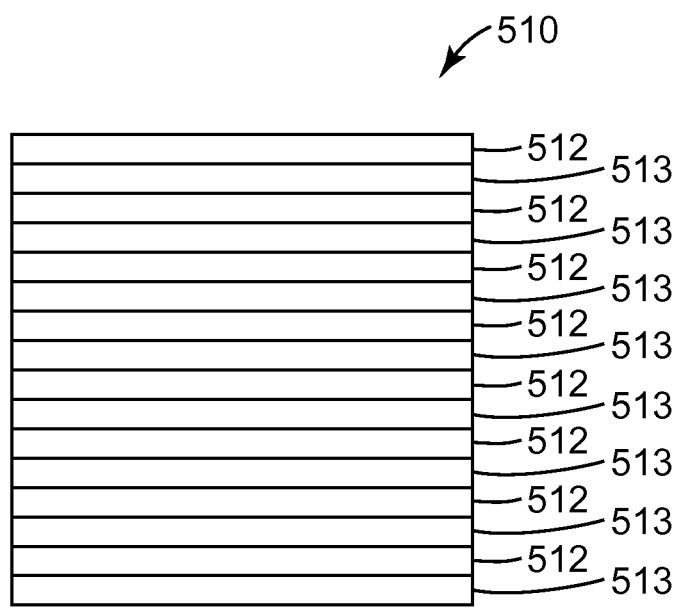
FIG. 3 is a cross sectional view of an embodiment of the plurality of layers deposited by layer-by-layer self-assembly 510.

With reference to FIG. 3, in one embodiment, the plurality of layers 510 deposited by layer-by-layer self-assembly is a polyelectrolyte stack comprising a polymeric polycation 512 and a polymeric polyanion 513. At least a portion of the polymeric cation layers, polymeric anion layers, or a combination thereof comprise a light stabilizing compound or light absorbing compound dispersed therein, and preferably covalently bonded to the polyelectrolyte. In this embodiment, the plurality of layers deposited by layer-by-layer self-assembly comprise a plurality of alternating polymer-polymer layers.

In other embodiments, the plurality of layers deposited by layer-by-layer self-assembly comprise a polyelectrolyte alternated with inorganic oxide nanoparticles, or in other words a plurality of alternating polymer-inorganic nanoparticle layers. In this embodiment, the plurality of layers 510 deposited by layer-by-layer self-assembly comprise a polymeric polycation or polymeric polyanion (e.g. 512) wherein at least a portion of the polyelectrolyte layers comprise a light stabilizing compound or light absorbing compound dispersed therein and inorganic oxide nanoparticles (e.g. 513) deposited as the oppositely charged polyion. For example, a polymeric polyanion, such as polyacrylic acid, can be alternated with anatase $TiO_2$, as a representative polycation. In another example, a polymeric polycation, such as poly(methacryloylamino)propyl]-trimethylammonium chloride, can be alternated with $SiO_2$, as a representative polyanion.

The plurality of layers deposited by layer-by-layer self-assembly typically provide an additional technical effect in addition to protection from light induced degradation as provided by the inclusion of the organic light absorbing or light stabilizing compound. For example, the plurality of layers deposited by layer-by-layer self-assembly may further provide a durable top coat (e.g. hardcoat), antireflection, or reflectivity of certain bandwidths of electromagnetic radiation. This embodiment is beneficial for both inorganic substrates as well as substrates comprising an organic material.

In one embodiment, the plurality of layers 510 deposited by layer-by-layer self-assembly may comprise a plurality of bi-layers that form a low or high refractive index stack. A low refractive index stack is then alternated with a high refractive index stack.

Figure 4:
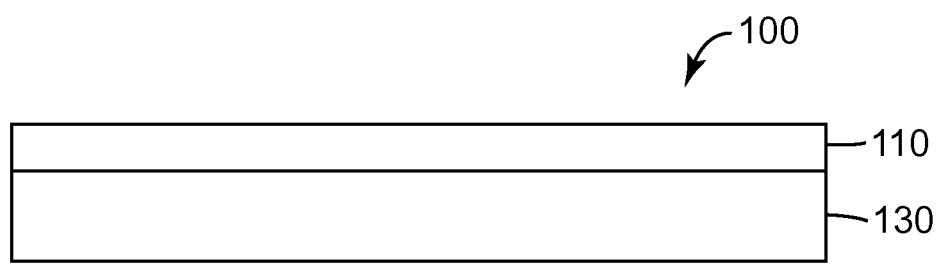
FIG. 4 is a cross sectional view of an illustrative article 100 comprising a multilayer optical film 130 and a plurality of layers deposited by layer-by-layer self-assembly 110, disposed on multilayer optical film 130.
Figure 4A:
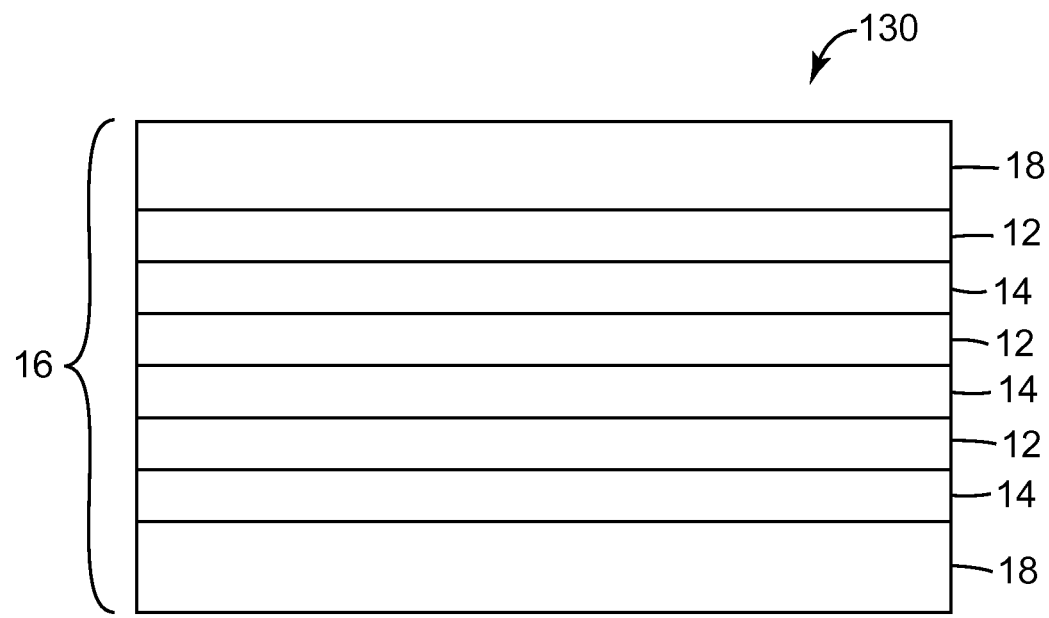
FIG. 4A is a cross sectional view of an illustrative multilayer optical film 130.
Figure 4B:
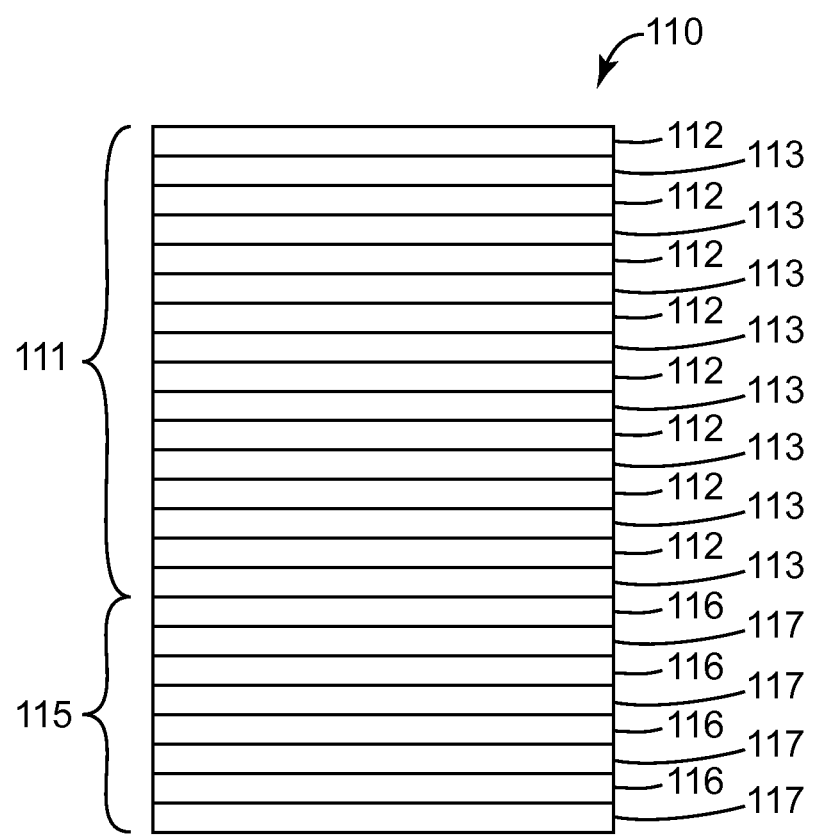
FIG. 4B is a cross sectional view of the plurality of layers deposited by layer-by-layer self-assembly 110.

For example, with reference to FIG. 4B, high refractive index stack 111 may comprise bi-layers of 112 that comprise high refractive index inorganic oxide nanoparticles, such as $TiO_2$, as a polycation, and 113, a polymeric polyanion such as polyacrylic acid. In FIG. 4B the illustrative high refractive index stack 111 comprises 8 alternating bi-layers. Low refractive index stack 115 may comprise bi-layers of 116 that comprise low refractive index inorganic oxide nanoparticles, such as $SiO_2$, as a polyanion and 117, a polymeric polycation such as poly(methacryloylamino)propyl-trimethylammonium chloride. In FIG. 4B the illustrative low refractive index stack 115 comprises 4 alternating bi-layers. Each stack can be characterized as a high or low refractive index layer comprising a plurality of polymer-inorganic oxide bi-layers.

The thickness of a bi-layer and the number of bi-layers are selected to achieve the desired protection from light induced degradation properties typically using the minimum total thickness of self-assembled layers and/or the minimum number of layer-by-layer deposition steps. In some embodiments, the thickness of a bi-layer, the number of bi-layers per stack, the number of stacks, and the thickness of each stack are selected to achieve the desired optical properties using the minimum total thickness of self-assembled layers and/or the minimum number of layer-by-layer deposition steps. The thickness of each bi-layer typically ranges from about 1 nm to 100 nm. The number of bi-layers per stack typically ranges from about 1 to 200. In some embodiments, the number of bilayers per stack is at least 2, 5, 10, 20, or 30. The number of stacks is typically at least 1, 2, 3, or 4 and no greater than 20, 19, 18, 17, or 15. The thickness of a stack is typically at least 25 nm, 35 nm, 45 nm, 55 nm, 65 nm, 75 nm, or 85 nm and no greater than 5, 6, 7, 8, 9, or 10 microns. In some embodiments, the thickness of a stack is no greater than 500 nm, 400 nm, 300 nm, 250 nm, 200 nm, or 150 nm. In other embodiments, the number of bi-layers is selected to achieve the desired transmission in combination with mechanical durability. In this embodiment, the thickness of a bi-layer and number of bi-layers may approach the maximum values. Further, this embodiment may utilize a single stack of low or high refractive index that may be index matched to the substrate or coating to which it is applied.

The light stabilizing or light absorbing compound is dispersed within at least a portion of the polyelectrolyte layers. In favored embodiments, the light stabilizing or light absorbing compound is covalently bonded to the polyelectrolyte.

In some embodiments, the light stabilizing or light absorbing compound is grafted onto a polyelectrolyte, by suitable methods as known in the art. For example the synthesis of grafting benzophenone onto poly(methacrylic acid) has been described in the literature (See *UV-Cross-Linkable Multilayer Microcapsules Made of Weak Polyectrolytes*, Qiangying Yi, Dongsheng Wen, and Gleb B. Sukorukov; Langmuir 2012, 28, 10922-10829). The synthesis of grafting benzophenone onto poly(acrylic acid) and poly (allylamine hydrochloride) has also been described in the literature (See *pH-Sensitive Bipolar Ion-Permselective Ultrathin Films*, Mi-Kyoung Park, Suxiang Deng, Rigoberto C. Advincula; J. Am. Chem. Soc. 2004, 126, (42), 13723-13731.)

Suitable polyelectrolytes include polycationic polymers such as linear and branched poly(ethyleneimine), poly(allylamine hydrochloride), polyvinylamine, chitosan, polyaniline, polypyrrole, polyamidoamine, poly(vinylbenzyltriamethylamine), polydiallyldimethylammonium chloride, poly (dimethylaminoethyl methacrylate), and poly (methacryloylamino)propyl-trimethylammonium chloride. Suitable polyanionic polymers include, but are not limited to, poly(vinyl sulfate), poly(vinyl sulfonate), poly(acrylic acid), poly(methacrylic acid), poly(styrene sulfonate), dextran sulfate, heparin, hyaluronic acid, carrageenan, carboxymethylcellulose, alginate, sulfonated tetrafluoroethylene based fluoropolymers such as Nafion®, poly (vinylphosphoric acid), and poly(vinylphosphonic acid).

The molecular weight of the polyelectrolyte can vary, ranging from about 1,000 g/mole to about 1,000,000 g/mole. In some embodiments, the molecular weight (Mw) of the (e.g. poly(styrene sulfonate)) negatively charged anionic layer ranges from 50,000 g/mole to 100,000 g/mole. In some embodiments, the molecular weight (Mw) of the (e.g. polydiallyldimethylammonium chloride) positively charged cationic layer ranges from 200,000 g/mole to 300,000 g/mole.

In favored embodiments, a random copolymer is formed by copolymerizing a light stabilizing or light absorbing compound comprising a (meth)acryl or vinyl group with an ionic monomer comprising a (meth)acryl or vinyl ether group.

A polymerizable ultraviolet absorbing compound suitable for grafting onto a polyelectrolyte or for copolymerization with a (meth)acryl or vinyl ether functional ionic monomer can be represented by the general UVA-L$_v$-A wherein UVA represents an ultraviolet absorbing or light stabilizing group, L$_v$ is a linking group covalently bonding UVA to A, and A is a vinyl (e.g. ether) group or a (meth) acrylate group represented by

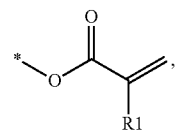

wherein R1 is methyl or H.

Various classes of compounds may be useful for providing the UVA group including for example benzophenones, benzotriazoles, triazines, cinnamates, cyano acrylates, dicyano ethylenes, salicylates, oxanilides, and para-amiobenzoates. In some embodiments, the ultraviolet absorbing group has enhanced spectral coverage in the long-wave UV region (e.g., 350 nm to 400 nm), enabling it to block the high wavelength UV light that can cause yellowing in polymers. In some embodiments, the pendent UVA group comprises a triazine, benzophenone, or benzotriazole.

The aromatic rings of the hydroxy-benzophenone, hydroxy-phenyl-benzotriazole, or hydroxy-phenyl-triazine core structure may optionally further comprise various substituents, as known in the art. For example, the core structure may comprise one or more (e.g. $C_1$ to $C_4$) alkyl groups optionally containing an ether linkage(s) or hydroxyl group(s).

Several starting compounds are commercially available or have been described in the literature having a polymerizable hydroxyl group (—OH) that can be reacted with acryloyl chloride for example to convert a hydroxyl group to a substituent having a (meth)acrylate group. In this embodiment, Lv is a bond. In other embodiments, Lv is alkylene, arylene, alkarylene or said linking group further comprising a heteratom such as O, N. or S.

The (e.g. hydroxy) benzophenone ultraviolet absorbing groups can be represented by the general core structure:

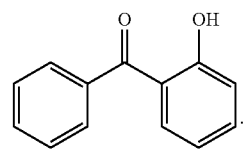 [SMILES: O=C(c1ccccc1)c1ccccc1O]

One suitable polymerizable benzophenone ultraviolet absorbing compound commercially available from Aldrich (Milwaukee, Wis.) and from Cytec Industries, Inc. (Woodland Park, N.J.) under the trade designation "Cyasorb UV-416" is 1,2-(4-benzoyl-3-hydroxyphenoxy)ethyl acrylate, depicted as follows:

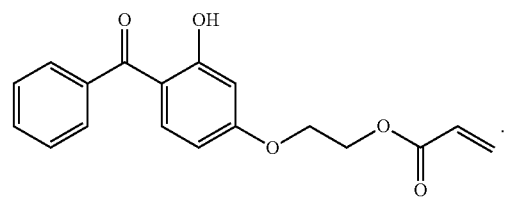 [SMILES: C=CC(=O)OCCOc1ccc(C(=O)c2ccccc2)c(O)c1]

Another representative polymerizable benzophenone ultraviolet absorbing compound is

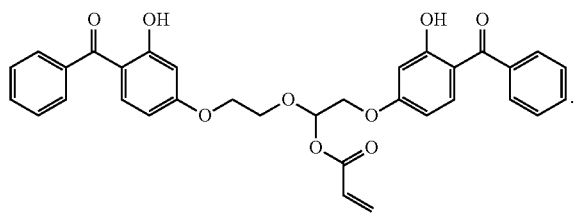 [SMILES: C=CC(=O)OC(COc1ccc(C(=O)c2ccccc2)c(O)c1)OCCOc1ccc(C(=O)c2ccccc2)c(O)c1]

This polymerizable ultraviolet absorbing compound is commercially available from Monomer-Polymer & Dajac Laboratories, Inc (Trevose, Pa.).

The (e.g. hydroxy-phenyl) benzotriazole ultraviolet absorbing groups can be represented by the general core structure:

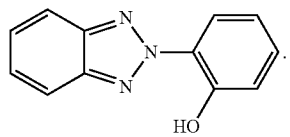 [SMILES: Oc1ccccc1-n1nc2ccccc2n1]

One suitable polymerizable benzotriazole ultraviolet absorbing compound is 2,2-[3-(2H-benzotriazol-2-yl)-4-hydroxyphenyl]ethyl methacrylate, depicted as follows:

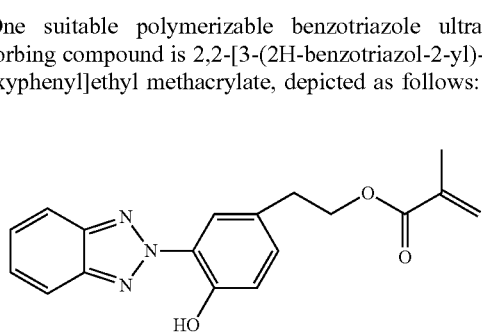

This polymerizable ultraviolet absorbing compound is commercially available from Aldrich (Milwaukee, Wis.) and also from BASF (Ludwigshafen, Germany) under the trade designation "Tinuvin R 796" and from Pharnorcia Inc. (Edison, N.J.) under the trade designation "NORBLOC 7966"

Another polymerizable benzotriazole ultraviolet absorbing compound has the structure:

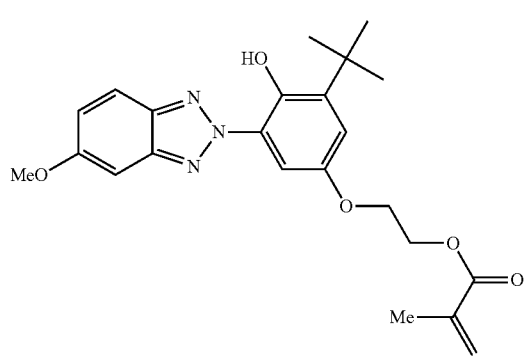 [SMILES: C=C(C)C(=O)OCCOc1cc(-n2nc3ccc(OC)cc3n2)c(O)c(C(C)(C)C)c1]

This polymerizable ultraviolet absorbing compound is commercially available from Adesis Inc. (New Castle, Del.) under the trade designation "ADESIS 16-102".

Traizines are characterized by having the following triazine ring structure:

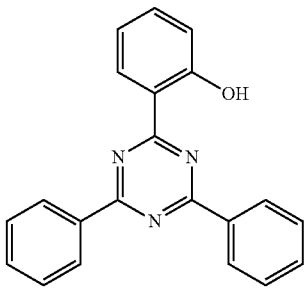 [SMILES: Oc1ccccc1-c1nc(-c2ccccc2)nc(-c2ccccc2)n1]

The aromatic rings can further comprise substitutent such as methyl substituents.

One representative polymerizable (e.g. hydroxy-phenyl) benzotriazine ultraviolet absorbing compound is depicted as follows:

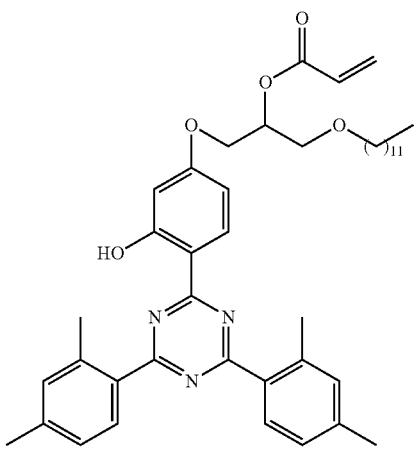

This polymerizable ultraviolet absorbing compound could be prepared from a precursor (that lacks a (meth)acrylate group) commercially available from Ciba Specialty Chemicals Corp., Additives Division.

The polymerizable light stabilizing compound suitable for grafting onto a polyelectrolyte or for copolymerization with a (meth)acryl or vinyl ether functional ionic monomer typically comprises a hindered amine group. Such compounds are typically derivatives of 2,2,6,6,-tetramethyl piperidine. One hindered amine light stabilizing compound (HALS) is commercially available from BASF (Ludwigshafen, Germany) under the trade designation "Tinuvin 152", having the following structure.

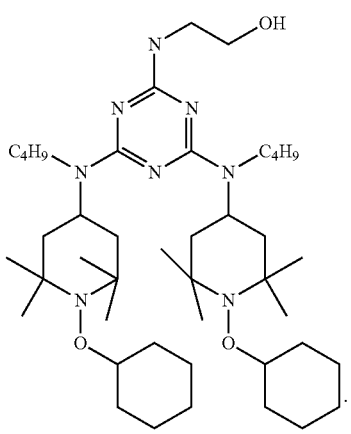

The hydroxyl group can be reacted with acryloyl chloride to convert the hydroxyl group to a substituent having a (meth)acrylate group.

Another hindered amine light stabilizing compound having a (meth)acryl group is 1,2,2,6,6-pentamethyl-4-piperidyl methacrylate, available from TCI America (Portland, Oreg.).

Other hindered amine light stabilizing groups can be represented by the general core structure:

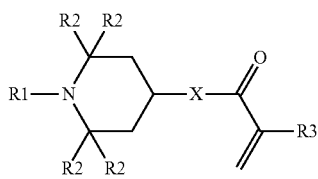

wherein
R1 is hydrogen or $C_1$-$C_4$ alkyl;
X is O or NR1;
R2 are independently $C_1$-$C_4$ alkyl such as methyl; and
R3 is hydrogen or methyl.

A random polyelectrolyte copolymer can be formed by copolymerizing at least one (meth)acryl or vinyl functional light absorbing or light stabilizing compound with at least one (meth)acryl or vinyl ether functional ionic monomer.

Suitable ionic monomers comprise a (meth)acryl or vinyl ether group and an ionic group such as an amine, hydroxyl, amide, thiol, sulfonic acid and salts thereof, phosphonic acid and salts thereof, sulfinate, sulfonate, sulfonium salt, phosphonium salt, silanol, carboxylic acid, carboxylates, ammonium salts, and the like. Representative anionic monomers include for example acrylic acid, methacrylic acid, itaconic acid, citric acid, vinyl sulfonic acid, vinyl phosphonic acid, 2-carboxyethyl acrylate, styrene sulfonic acid, maleic acid, 2-acrylamido-2-methylpropane sulfonic acid, and oleic acid. Representative cationic monomers include for example allyl amine, 2-(methacryloyloxy)ethyl trimethylammonium chloride, 2-(methacryloyloxy)ethyl trimethylammonium methylsulfate, vinyl pyridine, diallyldimethyl ammonium chloride, and oleyl amine.

Other copolymerizable monomers can also be included in the copolymerization of the polyelectrolyte copolymer provided the inclusion of such does not detract from the intended properties (e.g. protection from light-induced degradation). Such other repeat units can be derived from (meth)acryl or vinyl functional copolymerizable non-ionic monomers that lack a light absorbing or light stabilizing compound as well as ionic monomers that comprise a polymerizable moiety that is not a (meth)acryl or vinyl ether.

The polymerization reaction for making the copolymers according to the present disclosure can be carried out in the presence of an added free-radical initiator. Free radical initiators such as those widely known and used in the art may be used to initiate polymerization of the components. Examples of suitable free-radical initiators include azo compounds (e.g., 2,2'-azobisisobutyronitrile (AIBN), 2,2'-azobis (2-methylbutyronitrile), or azo-2-cyanovaleric acid), hydroperoxides (e.g., cumene, tert-butyl or tert-amyl hydroperoxide), dialkyl peroxides (e.g., di-tert-butyl or dicumylperoxide), peroxyesters (e.g., tert-butyl perbenzoate or di-tert-butyl peroxyphthalate), and diacylperoxides (e.g., benzoyl peroxide or lauryl peroxide).

The free-radical initiator may also be a photoinitiator. Examples of useful photoinitiators include benzoin ethers (e.g., benzoin methyl ether or benzoin butyl ether); acetophenone derivatives (e.g., 2,2-dimethoxy-2-phenylacetophenone or 2,2-diethoxyacetophenone); 1-hydroxycyclohexyl phenyl ketone; and acylphosphine oxide derivatives and acylphosphonate derivatives (e.g., bis(2,4,6-trimethylbenzoyl)phenylphosphine oxide, diphenyl-2,4,6-trimethylbenzoylphosphine oxide, isopropoxyphenyl-2,4,6-trimethylbenzoylphosphine oxide, or dimethyl pivaloylphosphonate). Many photoinitiators are available, for examples, from BASF (Ludwigshafen, Germany) under the trade designation "IRGACURE". The photoinitiator may be selected so that the wavelength of light required to initiate polymerization is not absorbed by the ultraviolet absorbing group.

In some embodiments, the polymerization reaction is carried out in solvent. The components may be present in the reaction medium at any suitable concentration, (e.g., from about 5 percent to about 80 percent by weight based on the total weight of the reaction mixture). Illustrative examples of suitable solvents include aliphatic and alicyclic hydrocarbons (e.g., hexane, heptane, cyclohexane), aromatic solvents (e.g., benzene, toluene, xylene), ethers (e.g., diethyl ether, glyme, diglyme, and diisopropyl ether), esters (e.g., ethyl acetate and butyl acetate), alcohols (e.g., ethanol and isopropyl alcohol), ketones (e.g., acetone, methyl ethyl ketone and methyl isobutyl ketone), halogenated solvents (e.g., methylchloroform, 1,1,2-trichloro-1,2,2-trifluoroethane, trichloroethylene, trifluorotoluene, and hydrofluoroethers available, for example, from 3M Company, St. Paul, Minn. under the trade designations "HFE-7100" and "HFE-7200"), and mixtures thereof.

In favored embodiments, the polyelectrolyte is prepared in an aqueous solvent. The term "aqueous" means that the liquid of the coating contains at least 85 percent by weight of water. It may contain a higher amount of water such as, for example, at least 90, 95, or even at least 99 percent by weight of water or more. The aqueous liquid medium may comprise a mixture of water and one or more water-soluble organic cosolvent(s), in amounts such that the aqueous liquid medium forms a single phase. Examples of water-soluble organic cosolvents include methanol, ethanol, isopropanol, 2-methoxyethanol, 3-methoxypropanol, 1-methoxy-2-propanol, tetrahydrofuran, and ketone or ester solvents. The amount of organic cosolvent typically does not exceed 15 wt-% of the total liquids of the coating composition. The aqueous polyelectrolyte composition for use in layer-by-layer self-assembly typically comprises at least 0.01 wt-%, 0.05 wt-% or 0.1 wt-% of polyelectrolyte and typically no greater than 5 wt-%, 4 wt-%, 3 wt-%, 2 wt-% or 1 wt-%.

Polymerization can be carried out at any temperature suitable for conducting an organic free-radical reaction. Temperature and solvent for a particular use can be selected by those skilled in the art based on considerations such as the solubility of reagents, temperature required for the use of a particular initiator, and desired molecular weight. While it is not practical to enumerate a particular temperature suitable for all initiators and all solvents, generally suitable temperatures are in a range from about 30° C. to about 200° C. (in some embodiments, from about 40° C. to about 100° C., or from about 50° C. to about 80° C.).

Free-radical polymerizations may be carried out in the presence of chain transfer agents. Typical chain transfer agents that may be used in the preparation compositions according to the present invention include hydroxyl-substituted mercaptans (e.g., 2-mercaptoethanol, 3-mercapto-2-butanol, 3-mercapto-2-propanol, 3-mercapto-1-propanol, and 3-mercapto-1,2-propanediol (i.e., thioglycerol)); poly (ethylene glycol)-substituted mercaptans; carboxy-substituted mercaptans (e.g., mercaptopropionic acid or mercaptoacetic acid): amino-substituted mercaptans (e.g., 2-mercaptoethylamine); difunctional mercaptans (e.g., di(2-mercaptoethyl)sulfide); and aliphatic mercaptans (e.g., octylmercaptan, dodecylmercaptan, and octadecylmercaptan).

Adjusting, for example, the concentration and activity of the initiator, the concentration of each of the reactive monomers, the temperature, the concentration of the chain transfer agent, and the solvent using techniques known in the art can control the molecular weight of the copolymer.

Copolymers according to the present disclosure in any of their embodiments include a first divalent unit comprising a pendent ultraviolet absorbing (UVA) group.

The first divalent unit can be considered to be a repeating unit in the copolymer disclosed herein. The first divalent unit may be represented by formula —[—CH$_2$—C(H)UVA-]-, —[—CH$_2$—C(H)C(O)—O—X—UVA-]-, —[—CH$_2$—C(H)C(O)—NH—X—UVA-]-, —[—CH$_2$—C(CH$_3$)C(O)—O—X—UVA-]-, or —[—CH$_2$—C(CH$_3$)C(O)—NH—X—UVA-]-, wherein X is an alkylene or alkyleneoxy group having from 1 to 10 (in some embodiments, 2 to 6 or 2 to 4) carbon atoms and optionally interrupted by one or more —O— groups and optionally substituted by a hydroxyl group, and wherein UVA includes any of the above embodiments of UVA groups. In the alkyleneoxy group, the oxygen is attached to the UVA group. The copolymer may include (e.g., at least 2, 3, 4, 5, 6, 7, 8, 9, 10, 15, or at least 20 up to 30, 35, 40, 45, 50, 100, or up to 200) of these repeating units. The repeating unit can be derived from a substituted vinyl, substituted acrylate, or substituted methacrylate group.

In some embodiments, the first divalent unit is represented by formula:

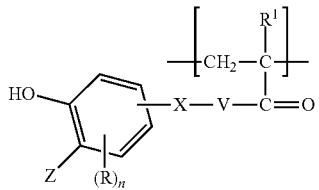

wherein R$^1$ is hydrogen or methyl, V is O or NH, X is alkylene or alkyleneoxy group having from 1 to 10 (in some embodiments, 2 to 6 or 2 to 4) carbon atoms and optionally interrupted by one or more —O— groups and optionally substituted by a hydroxyl group, R is alkyl (e.g., having from one to four carbon atoms), n is 0 or 1, and Z is a benzoyl group, a 4,6-bisphenyl[1,3,5]triazin-2-yl group, or a 2H-benzotriazol-2-yl group, wherein the benzoyl group, 4,6-bisphenyl[1,3,5]triazin-2yl group, and 2H-benzotriazol-2-yl group is optionally substituted by one or more alkyl, aryl, alkoxy, hydroxyl, or halogen substituents, or a combination of these substituents. In some embodiments, the alkyl and/or alkoxy substituent independently has 1 to 4 or 1 to 2 carbon atoms. In some embodiments, each halogen substituent is independently a chloro, bromo, or iodo group. In some embodiments, each halogen substituent is a chloro group. The term "aryl" as used herein includes carbocyclic aromatic rings or ring systems, for example, having 1, 2, or 3 rings and optionally containing at least one heteroatom (e.g., O, S, or N) in the ring. Examples of aryl groups include phenyl, naphthyl, biphenyl, fluorenyl as well as furyl, thienyl, pyridyl, quinolinyl, isoquinolinyl, indolyl, isoindolyl, triazolyl, pyrrolyl, tetrazolyl, imidazolyl, pyrazolyl, oxazolyl, and thiazolyl. In the alkyleneoxy group, the oxygen is attached to the substituted benzene ring. In some embodiments, each V is O and X is ethylene, propylene, butylenes, ethyleneoxy, propyleneoxy, or butyleneoxy, with the oxygen attached to the substituted benzene ring. In some embodiments, n is 0. In some embodiments, R is methyl, ethyl, n-propyl, isopropyl, n-butyl, isobutyl, s-butyl, or t-butyl, and n is 1. In some embodiments, Z is an unsubstituted benzoyl group. In some embodiments, Z is 4,6-bis(2,4-dimethylphenyl)[1,3,5]triazin-2-yl; 4,6-bis(2,4-diethylphenyl)[1,3,5]triazin-2-yl; 4,6-bis(2,4-dimethoxyphenyl)[1,3,5]triazin-2-yl; or 4,6-bis(2,4-diethoxyphenyl)[1,3,5]triazin-2-yl. In some embodiments, Z is 2H-benzotriazol-2-yl or 5-chloro-2H-benzotriazol-2-yl.

In typical embodiments, the organic light absorbing compound, organic light stabilizing compound, or combination thereof does not reduce the transmission of visible light by more than 5, 4, 3, 2, or 1%. Further, the organic light absorbing compound or organic light stabilizing compound typically does not impart color to the polyelectrolyte, meaning that the delta E value is no greater than 1 unit according to Hunter 1948 color space with dimension L for lightness and a and b for color-opponent dimensions.

Copolymers disclosed herein in any of their embodiments include (e.g., at least 1, 2, 3, 4, 5, 6, 7, 8, 9, 10, 15, or at least 20 up to 30, 35, 40, 45, 50, 100, or up to 200) second divalent units independently represented by formula:

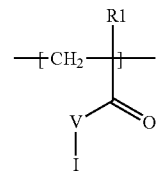

wherein R$^1$ is hydrogen or methyl;
V is a divalent linking group; and
I is an ionic group.

Suitable ionic groups, I, include amine, hydroxyl, amide, thiol, sulfonic, phosphonic, sulfinate, silanol, carboxylic acid, carboxylate, or ammonium salt. V can be a bond, alkylene, arylene, alkarylene, or a combination thereof, or said linking group further comprising heteroatoms such as O, N or S.

The first divalent units, comprising a light absorbing or light stabilizing group, are present in the copolymer in an amount of at least 0.5, 1.0, 1.5, 2.5, 3, 3.5, 4, 4.5 or 5 to 50 percent, based on the total weight of the copolymer. In some embodiments, the first divalent units are present in an amount of at least 5.5, 6, 6.5, 7, 7.5, 8, 8.5, 9, or 10 wt-% of the copolymer. In some embodiments, the first divalent units are present in an amount no greater than 45, 40, 35, 30, 25, or 20 wt-% of the copolymer. The second divalent units, comprising an ionic group are typically present in an amount of at least 50 percent, based on the total weight of the copolymer. In some embodiments, the second divalent units are present in the copolymer in an amount of at least 55, 60, 65, 70, 75, or 80 wt-% of the copolymer. In some embodiments, the second divalent units are present in an amount of at least 85 or 90 wt-% of the copolymer. In some embodiments, the second divalent units are present in an amount of at least 91, 92, 93, 94, 95, 96, 97, 98, or 99 wt-% of the copolymer. When the copolymer only comprises first and second divalent units, the sum of the first and second divalent units equals 100 wt-%. However, when the copolymer comprises other units that lack either an ionic group or a light absorbing or light stabilizing group, the sum of the first and second divalent units can be less than 100 wt-%.

The total concentration of the light absorbing and/or light stabilizing compound within the plurality of layers deposited by layer-by-layer self assembly can vary depending on the wt-% of first divalent units comprising a light absorbing or light stabilizing group present in the copolymer; the number of layers applied that contain such first divalent units; as well as the thickness of such layers. In some embodiments, only the polyanion or polycation comprises the light absorbing and/or light stabilizing compound (e.g. covalently bonded to a polyelectrolyte). In other embodiments, both the polyanion and polycation comprise a light absorbing and/or light stabilizing compound (e.g. covalently bonded to a polyelectrolyte). In these embodiments, every layer or every other layer deposited by layer-by-layer self assembly can comprise a light absorbing and/or light stabilizing compound (e.g. covalently bonded to a polyelectrolyte). In yet other embodiments, higher concentrations of light absorbing and/or light stabilizing compound may be utilized and applied at a lower frequency (e.g. every $4^{th}$ layer or only in a few layers near and including the exposed surface layer). Regardless of the layer-by-layer deposition technique, the total concentration of the light absorbing and/or light stabilizing compound within the plurality of layers deposited by layer-by-layer self assembly is typically at least 0.5, 1.0, 1.5, 2.5, 3, 3.5, 4, 4.5 or 5 to 30 wt-%. In some embodiments, the total concentration of the light absorbing and/or light stabilizing compound within the plurality of layers deposited by layer-by-layer self assembly is at least 5.5, 6, 6.5, 7, 7.5, 8, 8.5, 9, or 10 wt-%. In some embodiments, the total concentration of the light absorbing and/or light stabilizing compound within the plurality of layers deposited by layer-by-layer self assembly is no greater than 25 or 20 or 15 wt-%.

In some embodiments, the plurality of layers deposited by layer-by-layer self-assembly comprise a plurality of alternating polymer-inorganic oxide nanoparticle layers. The inorganic nanoparticles of the alternating polymer-inorganic nanoparticle layers typically have an average primary or agglomerate particle size diameter of at least 1, 2, 3, 4, or 5 nanometers and typically no greater than 80, 90 or 100 nanometers. In some embodiments, the nanoparticles have a relatively small average particle size. For example, the average primary or agglomerate particle size may be less than 30 nm, or 25 nm, or 20 nm, or 15 nm.

The average particle size of the nanoparticles of the dried self-assembled layers can be measured using transmission electron microscopy or scanning electron microscopy, for example. The average particle size of the nanoparticles in the nanoparticle suspension can be measured using dynamic light scattering. "Agglomerate" refers to a weak association between primary particles which may be held together by charge or polarity and can be broken down into smaller entities. "Primary particle size" refers to the mean diameter of a single (non-aggregate, non-agglomerate) particle. As used herein "aggregate" with respect to particles refers to strongly bonded or fused particles where the resulting external surface area may be significantly smaller than the sum of calculated surface areas of the individual components. The forces holding an aggregate together are strong forces, for example covalent bonds, or those resulting from sintering or complex physical entanglement. Although agglomerated nanoparticles can be broken down into smaller entities such as discrete primary particles such as by application of a surface treatment; the application of a surface treatment to an aggregate simply results in a surface treated aggregate. In some embodiments, a majority of the nanoparticles (i.e. at least 50%) are present as discrete unagglomerated nanoparticles. For example, at least 70%, 80% or 90% of the nanoparticles are present as discrete unagglomerated nanoparticles.

When present, the concentration of inorganic nanoparticles is typically at least 30 wt.-% of the dried low refractive index stack, high refractive index stack, or totality of self-assembled polymer-nanoparticle layers. The concentration of inorganic nanoparticles is typically no greater than about 80, 85, 90, or 95 wt.-%. The concentration of inorganic nanoparticles can be determined by methods known in the art, such as thermogravimetric analysis. In some embodiments, the dried low refractive index stack, high refractive index stack, or totality of self-assembled polymer-nanoparticle layers comprises at least 50, 55, 60, 65, or 70 wt.-% of inorganic nanoparticles to provide better mechanical durability and scratch resistance in addition to the reflectivity properties previously described.

Nanoparticles for use in the self-assembled polymer-nanoparticle layers include nanoparticles having a refractive index of no greater than 1.50 such as silica (although other oxides can be used, such as zirconia, alumina, ceria, tin (stannic) oxide,), or composite nanoparticles such as core-shell nanoparticles. A core-shell nanoparticle can include a core of an oxide (e.g., iron oxide) or metal (e.g., gold or silver) of one type and a shell of silica deposited on the core. Herein, "silica nanoparticles" refer to nanoparticles that include only silica as well as core-shell nanoparticles with a surface that includes silica. It is appreciated however, that unmodified silica nanoparticles commonly comprise hydroxyl or silanol functional groups on the nanoparticle surface, particularly when the nanoparticles are provided in the form of an aqueous dispersion. Aqueous dispersions of silica nanoparticles can also be ammonium or sodium stabilized. Silica has an isoelectric point at about pH 2 and can thus be used as a polyanion in the layer-by-layer self-assembly process at pH values greater than 2, more preferably at pH values greater than or equal to 3.

Inorganic silica sols in aqueous media are well known in the art and available commercially. Silica sols in water or water-alcohol solutions are available commercially under such trade names as LUDOX (manufactured by E.I. duPont de Nemours and Co., Inc., Wilmington, Del.), NYACOL (available from Nyacol Co., Ashland, Mass.) or NALCO (manufactured by Nalco Chemical Co., Naperville, Ill.). Some useful silica sols are NALCO 1115, 2326, 1050, 2327, and 2329 available as silica sols with mean particle sizes of 4 nanometers (nm) to 77 nm Another useful silica sol is NALCO 1034a available as a silica sol with mean particle size of 20 nanometers. A useful silica sol is NALCO 2326 available as a silica sol with mean particle size of 5 nanometers. Additional examples of suitable colloidal silicas are described in U.S. Pat. No. 5,126,394 (Revis et al.).

Clay platelet nanoparticles, such as montmorillonite, bentonite, and hectorite nanoparticles may be used, particularly for embodiments wherein the self-assembled layers provide a durable top coat for the substrate. Clay platelet-containing layer-by-layer self-assembled coatings can also impart flame retardance, oxygen barrier, water barrier, and corrosion-resistance properties to a coated substrate.

In some embodiments, the nanoparticles of the layer-by-layer self-assembled layers have a refractive index of greater than 1.60, 1.65, 1.70, 1.75, 1.80, 1.85, 1.90, 1.95, 2.00, 2.05, 2.10, 2.15, 2.20, 2.25, 2.30, 2.35, 2.40, 2.45, 2.50, 2.55, 2.60 such as titania, zirconia, alumina, tin oxides, antimony oxides, ceria, zinc oxide, lanthanum oxide, tantalum oxide, mixed metal oxides thereof, and mixtures thereof. Zirconia sols are available from Nalco Chemical Co. (Naperville, Ill.) under the trade designation "Nalco 00SS008", Buhler AG (Uzwil, Switzerland) under the trade designation "Buhler zirconia Z-WO sol" and Nissan Chemical America Corporation (Houston, Tex.) under the trade name NanoUse ZR™. Zirconia nanoparticles can also be prepared such as described in U.S. Patent Publication No. 2006/0148950 (Davidson et al.) and U.S. Pat. No. 6,376,590 (Kolb et al.). A nanoparticle dispersion that comprises a mixture of tin oxide and zirconia covered by antimony oxide (RI~1.9) is commercially available from Nissan Chemical America Corporation (Houston, Tex.) under the trade designation "HX-05M5". A tin oxide nanoparticle dispersion (RI~2.0) is commercially available from Nissan Chemicals Corp. under the trade designation "CX-S501M".

In some embodiments, the layer-by-layer self-assembled polymer-nanoparticle layers comprise titania. Various forms of titania can be utilized including anatase, brookite, rutile and amorphous forms. Anatase titania nanoparticle (5-15 nm diameter) dispersions are commercially available from U.S. Research Nanomaterials (Houston, Tex.) as an aqueous suspension at 15 wt %. $TiO_2$ sols are also available dispersed in strong acid or base condition from Ishihara Sangyo Kaisha Ltd. (Osaka, Japan). Titania has an isoelectric point at about pH 4-6 and thus can be used as a polyanion in layer-by-layer self-assembly at pH greater than 6, preferably pH greater than 7, more preferably pH greater than 8, or the polycation in layer-by-layer self-assembly at pH less than 4, more preferably pH less than 3.

Various other organic and inorganic nanoparticle particles can be used, as known in the art, some of which are described in Kurt et al., US 2010/0290109.

The layer-by-layer self-assembled polymer-inorganic oxide nanoparticle layers can provide a durable protective topcoat for a substrate. In this embodiment, the layer-by-layer self assembled stack may comprise a low or high refractive index stack, index matched to the substrate or coated surface thereof. Layer-by-layer self-assembled coatings with improved mechanical strength and wear resistance have been taught in U.S. Pat. No. 8,277,899 (Krogman et al.) and WO 2012/112624 (Olmeijer et al.)

In some embodiments, the selection of the inorganic materials will depend upon the reflection bandwidth of interest. For example, the plurality of layers deposited by layer-by-layer self-assembly can be a ¼ wave stack wherein control of the spectrum is achieved by controlling the thickness of the high and low refractive index stacks by altering the number of deposited bi-layers and/or altering the conditions during the layer-by-layer self-assembly process such as the pH and ionic strength of the liquid (e.g. bath) solutions. It is appreciated that the plurality of layers deposited by layer-by-layer self-assembly typically does not utilize birefringence for creating a refractive index difference between the low refractive and high refractive index stacks.

In some embodiments, the plurality of layers deposited by layer-by-layer self-assembly is light transmissive to visible light (400 to 700 nm), typically exhibiting i.e. at least 85% or 90% transmission for polymer-polymer layers and at least 70 or 75% for polymer-inorganic oxide nanoparticle layers. In some embodiments, the substrate is light transmissive to visible light (400 to 700 nm), typically exhibiting i.e. at least 85% or 90% transmission.

In one embodiment, the layer-by-layer self-assembled polymer-inorganic oxide nanoparticle layers can provide an antireflective coating for the substrate. The inclusion of the layer-by-layer self-assembled layers can reduce the surface reflections and thus increase transmission by 1, 2, 3, 4, or 5%.

The physical principles by which antireflection films and coatings function are known. AR films are often constructed of alternating high and low refractive index ("RI") polymer layers of the correct optical thickness. With regards to visible light, this thickness is on the order of one-quarter of the wavelength of the light to be reflected. The human eye is most sensitive to light around 550 nm Therefore it is desirable to design the low and high index coating thicknesses in a manner that minimizes the amount of reflected light in this optical range (e.g. 3%, 2%, 1% or lower). In some embodiments, the inclusion of the antireflective coating described herein reduces the average % reflection for 400 to 700 nm by at least 1, 2, 3, or 4%. Further the % reflection at 550 nm may be reduced by at least 1, 2, 3, or 4% as compared to the multilayer optical film lacking the antireflective layer-by-layer coating. An antireflective coating can be created by coating $SiO_2$ containing bi-layers at an optical thickness of ¼ wave. In other embodiments, the antireflective coating comprises at least one low refractive index bi-layer stack and at least one high refractive index bi-layer stack.

In some embodiments, the layer-by-layer self-assembled polymer-inorganic oxide nanoparticle layers may be selected to reflect a desired bandwidth. The plurality of layers deposited by layer-by-layer self-assembly function as a UV mirror, blue mirror, visible mirror, near infrared mirror, or combination thereof. Such self-assembled layers can be one-quarter wave stacks or non-quarter wave stack such as described in Kurt et al, US2010/0290109.

With respect to FIG. 4, in one embodiment, the present invention concerns multilayer optical film (MOF) substrates, wherein a plurality of layers 110 deposited by layer-by-layer self-assembly is disposed on multilayer optical film 130 and at least a portion of the layers comprise an organic light absorbing compound or organic light stabilizing compound dispersed within a polyelectrolyte. In some embodiments, the plurality of layers 110 deposited by layer-by-layer self-assembly forms a major surface layer that is exposed to the environment.

Multilayer optical films include a film having two or more layers. Multilayer optical films are useful, for example, as highly efficient mirrors and/or polarizers.

Various multilayer optical films are known. Multilayer optical films generally comprise alternating polymeric layers of at least one birefringent polymer (e.g. oriented semi-crystalline polymer) and one second polymer, the layers selected to achieve the reflection of a specific bandwidth of electromagnetic radiation.

FIG. 4A shows a multilayer polymer film 130 that may be used, for example, as an optical polarizer or mirror. The film 16 includes one or more first optical layers 12, one or more second optical layers 14, and optionally one or more (e.g. non-optical) additional layers 18. FIG. 4A includes a multilayer stack having alternating layers 12, 14 of at least two materials. In one embodiment, the materials of layers 12 and 14 are polymeric. An in-plane index of refraction $n_1$ in one in-plane direction of high refractive index layer 12 is higher than the in-plane index of refraction $n_2$ of low refractive index layer 14 in the same in-plane direction. The difference in refractive index at each boundary between layers 12, 14 causes part of the incident light to be reflected. The transmission and reflection characteristics of multilayer film 16 is based on coherent interference of light caused by the refractive index difference between layers 12, 14 and the thicknesses of layers 12, 14. When the effective indices of refraction (or in-plane indices of refraction for normal incidence) differ between layers 12, 14, the interface between adjacent layers 12, 14 forms a reflecting surface. The reflective power of the reflecting surface depends on the square of the difference between the effective indices of refraction of the layers 12, 14 (e.g., $(n_1-n_2)^2$). By increasing the difference in the indices of refraction between the layers 12, 14, improved optical power (higher reflectivity), thinner films (thinner or fewer layers), and broader bandwidth performance can be achieved. The refractive index difference in one in-plane direction in an exemplary embodiment is at least about 0.05, preferably greater than about 0.10, more preferably greater than about 0.15 and even more preferably greater than about 0.20.

In one embodiment, the materials of layers 12, 14 inherently have differing indices of refraction. In another embodiment, at least one of the materials of the layers 12, 14 has the property of stress induced birefringence, such that the index of refraction (n) of the material is affected by the stretching process. By stretching multilayer film 16 over a range of uniaxial to biaxial orientations, films can be created with a range of reflectivities for differently oriented plane polarized incident light.

The number of layers is typically at least 10, 25, 50 or 100. In favored embodiments, the number of layers in multilayer film 16 is selected to achieve the desired optical properties using the minimum number of layers for reasons of film thickness, flexibility and economy. In the case of reflective films such as polarizers and mirrors, the number of layers is preferably less than about 2,000, more preferably less than about 1,000, and even more preferably less than about 750. In some embodiments, the number of layer is at least 150 or 200. In other embodiments, the number of layer is at least 250.

In some embodiments, the multilayer polymer film further comprises optional additional non-optical or optical layers. The additional layers 18 are polymer layers that are disposed within the film 16. Such additional layers may protect the optical layers 12, 14 from damage, aid in the co-extrusion processing, and/or to enhance post-processing mechanical properties. The additional layers 18 are often thicker than the optical layers 12, 14. The thickness of the additional (e.g. skin) layers 18 is usually at least two times, preferably at least four times, and more preferably at least ten times, the thickness of the individual optical layers 12, 14. The thickness of the additional layers 18 may be varied to make a multilayer polymer film 16 having a particular thickness. A tie layer (not shown) may be present between the non-optical skin layer and the optical layers. Further, a top coat (also not shown) may be disposed upon the skin layer. Typically, one or more of the additional layers 18 are placed so that at least a portion of the light to be transmitted, polarized, and/or reflected by the optical layers 12, 14, also travels through the additional layers (i.e., the additional layers are placed in the path of light which travels through or is reflected by the optical layers 12, 14).

One embodiment of multilayer film 16 comprises multiple low/high index pairs of film layers, wherein each low/high index pair of layers has a combined optical thickness of ½ the center wavelength of the band it is designed to reflect. Stacks of such films are commonly referred to as quarterwave stacks. For multilayer optical films concerned with the visible and the near infrared wavelengths, a quarterwave stack design results in each of the layers 12, 14 in the multilayer stack having an average thickness of not more than about 0.5 micrometers. In other exemplary embodiments, different low/high index pairs of layers may have different combined optical thicknesses, such as where a broadband reflective optical film is desired.

Asymmetric reflective films (such as films resulting from unbalanced biaxial stretching) may be desirable for certain applications. In that case, average transmission along one stretch direction may be desirably less than, for example, about 50 percent, while the average transmission along the other stretch direction may be desirably less than, for example, about 20 percent, over a bandwidth of, for example, the visible spectrum (about 380-750 nm), or over the visible spectrum and into the near infrared (e.g., about 380-850 nm).

Multilayer optical films can also be designed to operate as reflective polarizers. One way to produce a multilayer reflective polarizer is to uniaxially stretch a multilayer stack. The resulting reflective polarizers have high reflectivity for light with its plane of polarization parallel to a first in-plane axis (usually, in the stretch direction) for a broad range of angles of incidence, and simultaneously have low reflectivity and high transmissivity for light with its plane of polarization parallel to a second in-plane axis that is orthogonal to the first in-plane axis (usually, in the non-stretch direction) for a broad range of angles of incidence. By controlling the three indices of refraction of each film, $n_x$, $n_y$, and $n_z$, the desired polarizer behavior can be obtained. See, for example, U.S. Pat. No. 5,882,774 (Jonza et al.).

The first optical layer(s) are prepared from a birefringent polymer having an in-plane birefringence (the absolute value of $n_x-n_y$) after orientation of at least 0.10 and preferably at least 0.15. In some embodiments the birefringence of the first optical layer is 0.20 or greater. The refractive index of the polyester for 632.8 nm light polarized in a plane parallel to the stretch direction can increase from about 1.62 to as high as about 1.87. For other types of multilayer optical films, such as those utilized as a mirror film, the out-of-plane birefringence properties are of importance. In some embodiments, the average out-of-plane birefringence is at least 0.10, at least 0.15 or at least 0.20.

The optical layers 12, 14 and the optional additional layers 18 of the multilayer polymer film 16 are typically composed of polymers such as polyesters. Polyesters include carboxylate and glycol subunits and are generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. The properties of a polymer layer or film vary with the particular choice of monomer molecules of the polyester.

Various suitable polyester polymers have been described in the art, some of which are described in Provisional Application Ser. No. 61/768,631, filed Feb. 25, 2013; incorporated herein by reference in its entirety. An exemplary polymer useful as the birefringent layer in the multilayer optical films of the present invention is polyethylene naphthalate (PEN), which can be made, for example, by reaction of naphthalene dicarboxylic acid with ethylene glycol. Polyethylene 2,6-naphthalate (PEN) is frequently chosen as a birefringent polymer. PEN has a large positive stress optical coefficient, retains birefringence effectively after stretching, and has little or no absorbance within the visible range. PEN also has a large index of refraction in the isotropic state. Its refractive index for polarized incident light of 550 nm wavelength increases when the plane of polarization is parallel to the stretch direction from about 1.64 to as high as about 1.9. Increasing molecular orientation increases the birefringence of PEN. The molecular orientation may be increased by stretching the material to greater stretch ratios and holding other stretching conditions fixed. Copolymers of PEN (CoPEN), such as those described in U.S. Pat. No. 6,352,761 (Hebrink et al.) and U.S. Pat. No. 6,449,093 (Hebrink et al.) are particularly useful for their low temperature processing capability making them more coextrusion compatible with less thermally stable second polymers. Other semicrystalline polyesters suitable as birefringent polymers include, for example, polybutylene 2,6-naphthalate (PBN), polyethylene terephthalate (PET), and copolymers thereof such as those described in U.S. Pat. No. 6,449,093 B2 (Hebrink et al.) or U.S. Pat. App. No. 2006/0084780 (Hebrink et al.), both herein incorporated by reference in their entirety. Alternatively, syndiotactic polystyrene (sPS) is another useful birefringent polymer.

The second polymer of the multilayer optical film can be made from a variety of polymers having glass transition temperatures compatible with that of the first birefringent polymer and having a refractive index similar to the isotropic refractive index of the birefringent polymer. Examples of other polymers suitable for use in optical films and, particularly, in the second polymer include vinyl polymers and copolymers made from monomers such as vinyl naphthalenes, styrene, maleic anhydride, acrylates, and methacrylates. Examples of such polymers include polyacrylates, polymethacrylates, such as poly (methyl methacrylate) (PMMA), and isotactic or syndiotactic polystyrene. Other polymers include condensation polymers such as polysulfones, polyamides, polyurethanes, polyamic acids, and polyimides. In addition, the second polymer can be formed from homopolymers and copolymers of polyesters, polycarbonates, fluoropolymers, and polydimethylsiloxanes, and blends thereof.

In some favored embodiments, the multilayer optical film comprises or consists of quarterwave film stacks. In this case, control of the spectrum requires control of the layer thickness profile in the film stack. A broadband spectrum, such as one required to reflect visible light over a large range of angles in air, still requires a large number of layers if the layers are polymeric, due to the relatively small index differences achievable with polymer films compared to inorganic films. Layer thickness profiles of such films can be adjusted to provide for improved spectral characteristics using the axial rod apparatus taught in U.S. Pat. No. 6,783,349 (Neavin et al.); incorporated herein by reference combined with layer profile information obtained with microscopic techniques.

The multilayer optical film can be an ultraviolet reflector, a blue reflector, a visible reflector, or an infared reflector, as further described in previously incorporated Provisional Application Ser. No. 61/768,631, filed Feb. 25, 2013.

In some embodiments, the multilayer optical film can be characterized as a UV reflective multilayer optical film (i.e. a UV reflector or UV mirror). A UV reflective multilayer optical film refers to a film having a reflectivity at normal incidence of at least 50, 60, 70, 80, or 90% for a bandwidth ranging from 290 nm to 400 nm. In some embodiments, the reflectivity at normal incidence for a bandwidth ranging from 290 nm to 400 nm is at least 91, 92, 93, 94, 95, 96, 97, or 98%. A UV reflective multilayer optical film can have low reflectivity and high transmission for visible light. For example the transmission of visible light can be at least 85% or 90%.

In some embodiments, the multilayer optical film can be characterized as a UV-blue reflective multilayer optical film (i.e. a UV-blue reflector or UV-blue mirror). A UV-blue reflective multilayer optical film refers to a film having a reflectivity at normal incidence of at least 50, 60, 70, 80, or 90% for a bandwidth ranging from 350 nm to 490 nm. In some embodiments, the reflectivity at normal incidence for a bandwidth ranging from 350 nm to 490 nm is at least 91, 92, 93, 94, 95, 96, or 97%. The UV-blue reflective multilayer optical film can have low reflectivity and high transmission for visible light having wavelength greater than 500 nm. For example the transmission of visible light having wavelength greater than 500 nm can be at least 85% or 90%.

In some embodiments, the multilayer optical film can be characterized as a near infrared reflective multilayer optical film (i.e. near infrared reflector or near infrared mirror). A near infrared reflective multilayer optical film refers to a film having a reflectivity at normal incidence of at least 50, 60, 70, 80, or 90% for a bandwidth ranging from 870 nm to 1100 nm. In some embodiments, the reflectivity at normal incidence for a bandwidth ranging from 870 nm to 1100 nm is at least 91, 92, 93, or 94%. In some embodiments, the film exhibits this same near infrared reflectivity at a 45 degree angle. The near infrared reflective multilayer optical film can have low reflectivity and high transmission for visible light. For example the transmission of visible light can be at least 85%, 86%, 87% or 88%.

A visible light reflective multilayer optical film (e.g. visible reflector or visible mirror) refers to a film having a reflectivity at normal incidence of at least 50, 60, 70, 80, or 90% for a bandwidth ranging from 400 nm to 700 nm. In some embodiments, the reflectivity at normal incidence for a bandwidth ranging from 400 nm to 700 nm is at least 91, 92, 93, 94, 95, 96, 97, or 98%. The near infrared reflectivity properties of such broadband reflector are as previously described.

In other embodiments, a single multilayer optical film can reflect more than one bandwidth and may be considered a broadband reflector. For example, the multilayer optical film may be a visible and near infrared reflective multilayer optical film. Thus, such multilayer optical film has high reflectivity of both visible and near infrared bandwidths.

Additionally, two or more multilayer optical film mirrors, e.g. with different reflection bands, laminated together to broaden the reflection band. For example, a multilayer optical film visible reflector, such as previously described, can be combined with a UV, a UV-blue, and/or near infrared reflector. Various other combinations can be made as appreciated by one of ordinary skill in the art.

In some embodiments, the plurality of layers deposited by layer-by-layer self-assembly reflects at least a portion of the same bandwidth of electromagnetic radiation as the multilayer optical film. For example the plurality of layers deposited by layer-by-layer self-assembly can increase the average reflectivity (e.g. for visible light) from about 10% to 20, 30, or 35%.

In other embodiments, the plurality of layers deposited by layer-by-layer self-assembly reflects at least a portion of a different bandwidth of electromagnetic radiation than the multilayer optical film. For example, the inclusion of the plurality of layers deposited by layer-by-layer self-assembly can increase the average reflectivity (e.g. for UV light) from about 35% to 40, 45, or 50%. In yet another embodiment, the inclusion of the plurality of layers deposited by layer-by-layer self-assembly can increase the average reflectivity (e.g. for 290-400 nm) from about 15% to 30, 35, 40, or 45%.

The (e.g. MOF) substrate may optionally include a (e.g. durable) protective top coat as one type of organic polymeric coating that can further contribute to preventing premature degradation due to exposure to light. It is appreciated that the layer that was formerly the "top coat" of the substrate becomes an intermediate layer after the plurality of self-assembled layers are disposed upon the substrate.

The (e.g. durable) protective topcoat, also referred to as a hardcoat, can be abrasion and impact resistant and does not interfere with the primary function of reflecting a selected bandwidth of electromagnetic radiation. Top coat layers may include one or more of the following non-limiting examples, PMMA/PVDF blends, thermoplastic polyurethanes, curable polyurethanes, CoPET, cyclic olefin copolymers (COC's), fluoropolymers and their copolymers such as polyvinylidene fluoride (PVDF), ethylene tetrafluoroethyelene (ETFE), fluorinated ethylene propylene (FEP), and copolymers of tetrafluoroethylene, hexafluoropropylene, and vinylidene fluoride (THV), thermoplastic and curable acrylates, cross-linked acrylates, cross-linked urethane acrylates, cross-linked urethanes, curable or cross-linked polyepoxides, and silicone polyoxamide. Strippable polypropylene copolymer skins may also be employed. Alternatively, silane silica sol copolymer hard coating can be applied as a durable top coat to improve scratch resistance.

The thickness of the top coat is dependent upon an optical density target at specific wavelengths as calculated by Beer's Law. In some embodiments, the top coat has an optical density greater than 3.5 at 380 nm; greater than 1.7 at 390; and greater than 0.5 at 400 nm. Typical protective layer thicknesses are from 0.5 to 15 mils.

The top coat can also comprise various (polymerizable or unpolymerizable) additives such as light absorbers (UVA) that comprise a benzotriazole, benzophenone, or triazine group, hindered amine light stabilizers (HALS) and combinations thereof in amounts ranging from about 2-10%. Such UVA absorbers are the same classes of compounds previously described except that the inclusion of a (meth)acryl or vinyl group is optional.

The top coat can comprise inorganic oxide nanoparticles, such as non-pigmentary zinc oxide and titanium oxide, as light blocking or scattering additives. For example, nanoscale particles can be dispersed in polymer or coating substrates to minimize UV radiation degradation. The nanoscale particles are transparent to visible light while either scattering or absorbing harmful UV radiation thereby reducing damage to thermoplastics. The concentration of such inorganic oxide nanoparticles is typically less than 5, 4, 3, 2, or 1 wt.-%.

It is within the scope of the present disclosure to include UV protective topcoats on both major surfaces of a (e.g. MOF) substrate. In some embodiments, it may be desirable to have a UV protective topcoat only between the substrate and the plurality of layers deposited by layer-by-layer self-assembly or only on the opposite surface as the plurality of layers deposited by layer-by-layer self-assembly.

Optional UV protective hardcoats can be provided by techniques known in the art, including those described in U.S. Pat. No. 7,153,588 (McMan et al.) and application having U.S. Ser. No. 61/614,297 (Clear et al.). Additional hard coats include silica filled siloxanes available, for example, from California Hard Coat (San Diego, Calif.) under the trade designation "PERMANEW", and from Momentive Performance Materials (Albany, N.Y.) under the trade designations "AS4000", "AS4700", and "UVHC-3000". Exemplary acrylic UV protective hardcoats are available, for example, under the trade designations "UVT610 (GEN IV)" and "UVT200" from Red Spot Paint & Varnish Company (Evansville, Ind.). Exemplary UV protective acrylic hard coats are disclosed, for example, in application WO2013/142239. Use of hardcoats can, for example, reduce or prevent premature degradation of the article due to exposure to outdoor elements. The hardcoat is generally abrasion and impact resistant and does not interfere with the primary function of reflecting a selected bandwidth of electromagnetic radiation.

However, since the plurality of layer-by-layer self-assembled layers can minimize UV radiation degradation by reflecting UV radiation, in some embodiments, the substrate (inclusive of the optional layer(s)) is free of inorganic oxide particles and may also be free of organic light absorbing or light stabilizing compounds in the organic coating layer (e.g. topcoat when present).

The inclusion of a plurality of layers deposited by layer-by-layer self-assembly wherein at least a portion of the layer comprises an organic light absorbing compound, an organic light stabilizing compound, or a combination thereof dispersed within and preferably covalently bonded to a polyelectrolyte can provide protection from light-induced degradation to any substrate. This is particularly useful for substrates and articles for outdoor usage and/or substrates subject to high levels of exposure to solar radiation. The organic light absorbing compound, organic light stabilizing compound, or a combination thereof can be chosen to protect a substrate from the light emitted from a light source, such as a lamp, in addition to or instead of protecting the component from terrestrial solar radiation.

In some embodiments, the substrate is a woven or nonwoven material suitable for use for clothing, tents, awnings, window coverings such as blinds, as well as upholstery for furniture as well as automotive (e.g. convertible car roofs) and marine surfaces including sails.

In other embodiments, the substrate is an optical film having high transmission of visible light such as a cover (glass or organic) polymeric substrate for an optical display, a (e.g. reflective) polarizing film or a brightness enhancing film suitable for use in various liquid crystal displays (LCD) and light-emitting diode displays (LEDs).

Films having a high transmission of visible light including UV, IR and visible mirrors may also be used in architectural applications, greenhouse applications, window films, paint protection films, solar power applications, lighting, fenestration products (i.e., products that fill openings in a building, such as windows, doors, skylights, or curtain walls, e.g., that are designed to permit the passage of light), solar light tube products and other daylighting systems for transporting sunlight to interior rooms, and other applications.

In other embodiments, the substrates described herein may be used in commercial graphics films (e.g. films for billboards, building exteriors, signage, automobiles, mass transit vehicles, etc.), traffic signage, and protection films such as car wrap films.

In some favored embodiments, the multilayer optical film of the present disclosure is utilized as a broadband reflector for solar concentrators of solar cells of solar power systems.

Figure 5:
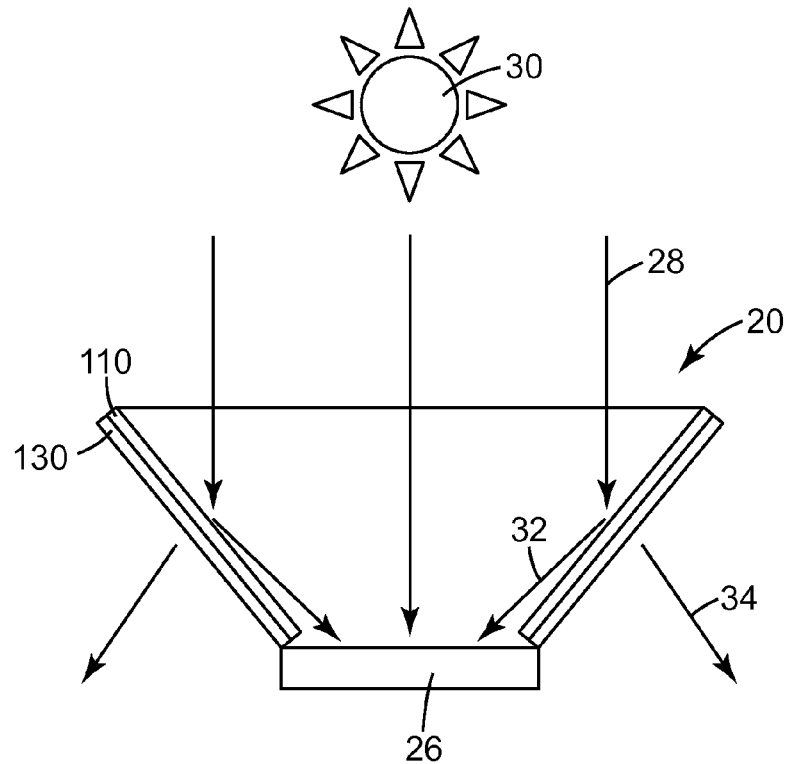
FIG. 5 is a schematic view of a solar cell.

As described for example in US2009/0283144 (Hebrink et al.); incorporated herein by reference, FIG. 5 illustrates a general application of the article 20 as a solar concentrating mirror. Article 20 comprises a multilayer optical film 130 having self-assembled layers 110 positioned in close proximity to a solar cell 26. The article 20 receives electromagnetic radiation 28 from the sun 30. A select bandwidth 32 of the electromagnetic radiation 28 is reflected onto solar cell 26. An undesirable bandwidth 34 of electromagnetic radiation passes through article 20 and is not reflected onto solar cell 26.

Figure 6:
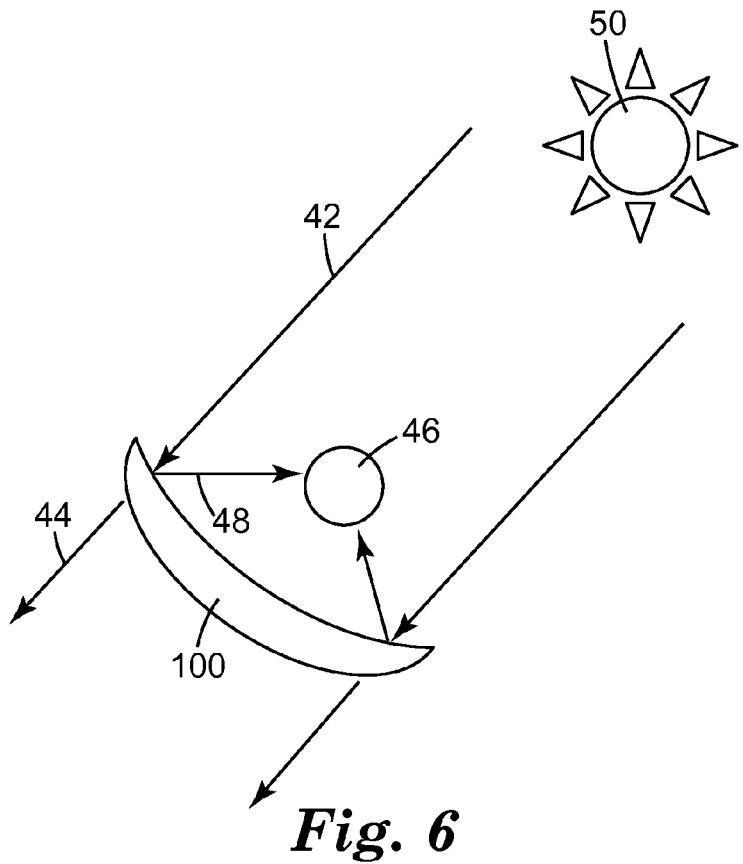
FIG. 6 is a schematic view of another embodiment of a solar cell.

FIG. 6 is another general embodiment depicting the inventive article in the form of a parabolic solar concentrating mirror 100. Electromagnetic radiation 42 from the sun 50 is received by the parabolic solar concentrating mirror 100. A preferred bandwidth 48 is reflected onto a solar cell 46 while an undesirable bandwidth 44 of electromagnetic radiation passes through the parabolic solar concentrating mirror 100 and is not reflected onto the solar cell 46 where it could potentially alter the operational efficiency of the solar cell. The shape of the article may include parabolic or other curved shapes, such as for example sinusoidal.

Figure 7:
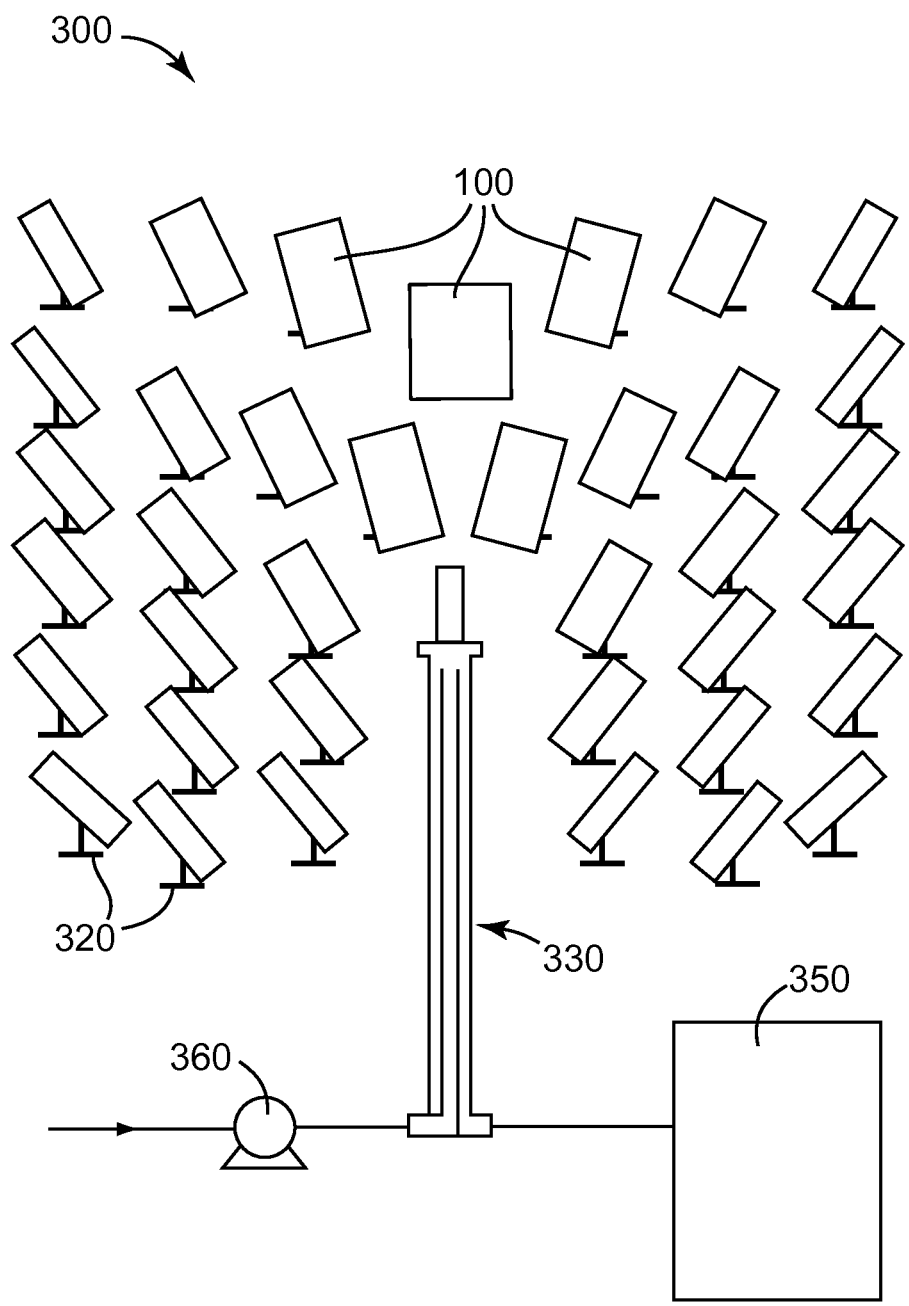
FIG. 7 is a schematic plan view of a concentrated solar power system.

As described for example in US2012/0011850 (Hebrink et al.); incorporated herein by reference, an exemplary concentrated solar power system 300 is depicted schematically in FIG. 7. Concentrated solar power system 300 comprises broadband reflectors 100 connected to celestial tracking mechanism 320 that is capable of aligning direct solar radiation from broadband reflectors 100 onto hollow receiver 330. A heat transfer fluid circulates by means of pump 360 through the hollow receiver 330 where it is heated by concentrated solar radiation. The heated heat transfer fluid is then directed to an electrical generator 350 (e.g., a steam turbine) where the thermal energy is converted to electrical energy. In another embodiment, the heat transfer fluid may be directed to a heat exchanger instead of the electrical generator, where the heat content is transferred to a liquid medium such as, for example, water that is converted to steam which drives the electrical generator.

Figure 8:
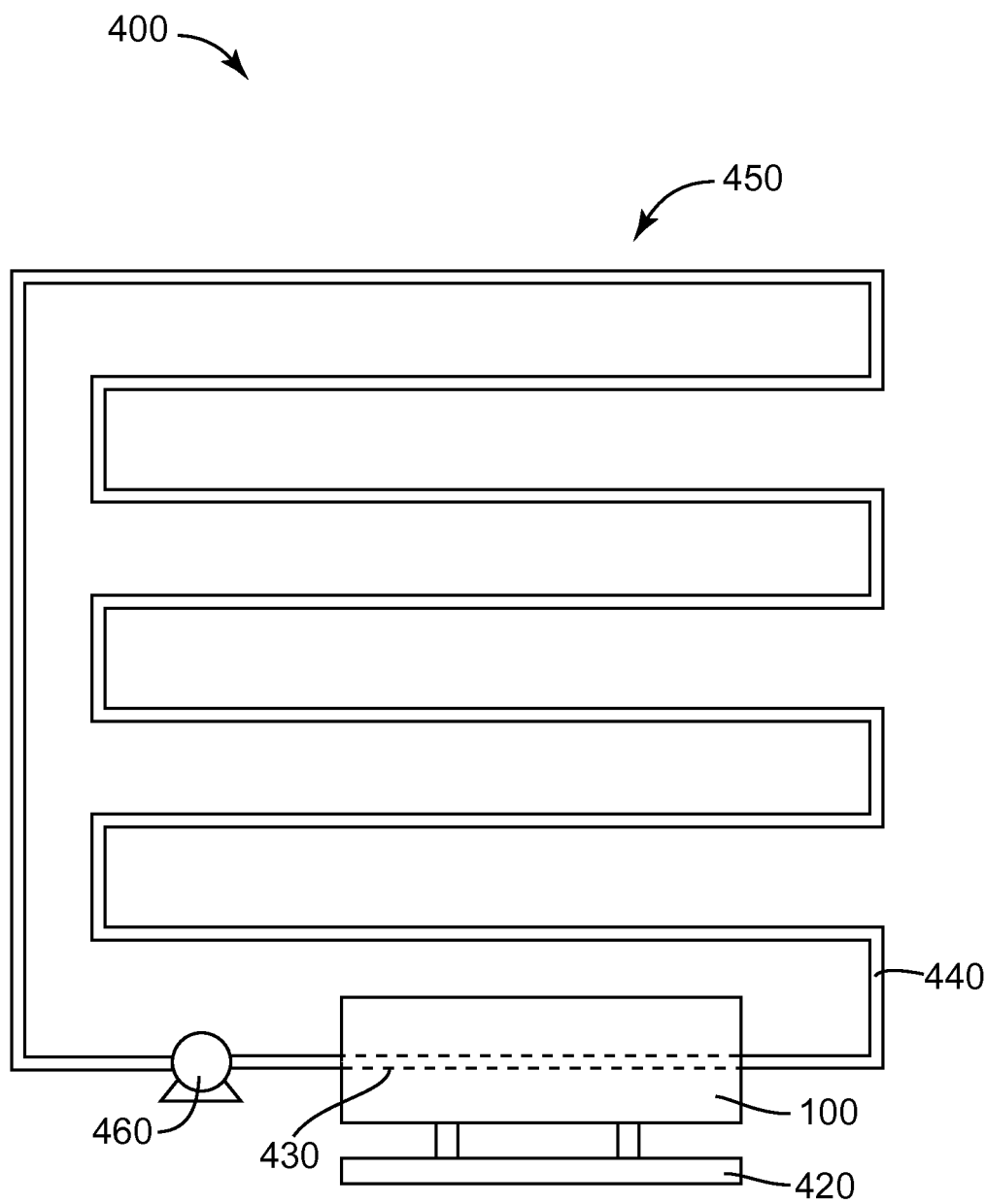
FIG. 8 is a schematic plan view of another embodiment of a concentrated solar power system.

Another exemplary concentrated solar power system 400 is depicted schematically in FIG. 8. Concentrated solar power system 400 comprises parabolic trough-shaped broadband reflectors 100 connected to celestial tracking mechanism 420 that is capable of aligning direct solar radiation from broadband reflectors 100 onto hollow receiver 430. A heat transfer fluid 440 circulates by means of pump 460 through the hollow receiver 430 where it is heated by concentrated solar radiation. The heated heat transfer fluid 440 is then directed to a thermal heating system 450 where the thermal energy is converted to electrical energy.

The hollow receivers may be transparent or opaque and should typically be made of material (e.g., metal or glass) that is capable of withstanding the light and heat directed upon it by the broadband reflectors. Exemplary heat transfer fluids include water, water/glycol mixtures, brine, molten salts, and oils, with the selected typically being dictated by application requirements and cost. Often the hollow receivers comprise an interior pipe coated with a solar absorbing material disposed inside an exterior transparent (e.g., glass) pipe, although other configurations may also be used. In some embodiments, the heated heat transfer fluid flowing through the solar absorbing hollow receiver exchanges heat with water to create steam that drives an electric generator.

Further enhancements in the concentrated solar power system output may be achieved when anti-reflective surface structured films or coatings are applied to the front surface of the hollow receiver. Surface structures in the films or coating typically change the angle of incidence of light such that it enters the polymer and hollow receiver beyond the critical angle and is internally reflected, leading to more absorption by the hollow receiver. Such surface structures can be in the shape, for example, of linear prisms, pyramids, cones, or columnar structures. For prisms, typically the apex angle of the prisms is less than 90 degrees (e.g., less than 60 degrees). The refractive index of the surface structured film or coating is typically less than 1.55 (e.g., less than 1.50). These anti-reflective surface structured films or coatings can be made durable and easily cleanable with the use of inherently UV stable and hydrophobic or hydrophilic materials. Anti-reflective coatings (e.g., nanostructured coatings or low refractive index coatings) could also be applied to the interior glass surface of the hollow receiver. Durability of the anti-reflective coatings or films can be enhanced with the addition of inorganic nano-particles.

Broadband reflectors according to the present disclosure may also be useful, for example, for concentrated photovoltaic systems. For example, a broadband reflector disclosed herein may be useful when placed in proximity to a multi junction GaAs cell, which has an absorption bandwidth from about 350 nm to about 1750 nm, or a mono-crystalline silicon photovoltaic cell having an absorption bandwidth of about 400 nm to about 1150 nm. In some embodiments, a thermal management device (e.g., in the form of ribs, pins, or fins) may be used to dissipate heat from the solar cell.

Advantages and embodiments of this disclosure are further illustrated by the following examples, but the particular materials and amounts thereof recited in these examples, as well as other conditions and details, should not be construed to unduly limit this disclosure. All materials are commercially available or known to those skilled in the art unless otherwise stated or apparent.

EXAMPLES

Materials

Unless otherwise noted, all parts, percentages, ratios, etc., in the examples and in the remainder of the specification are by weight. Unless otherwise noted, all chemicals were obtained from, or are available from, chemical suppliers such as Aldrich Chemical Company, Milwaukee, Wis.

The following is a list of materials used throughout the Examples, as well as their brief descriptions and origins.

"UVA-1" refers to 2-[2-hydroxy-5-[2-(methacryloyloxy)-ethyl]phenyl]-2H-benzotriazole, a polymerizable UV absorber, obtained from TCI, Tokyo, Japan.

"HALS-1" refers to 1,2,2,6,6-pentamethyl-4-piperidyl methacrylate, a polymerizable hindered amine light stabilizing compound, obtained from TCI America, Portland, Oreg.

"AA" refers to acrylic acid, obtained from Alfa Aesar, Ward Hill, Mass.

"MAPTAC" refers to a 50% solids solution of methacryloylaminopropyl-trimethylammonium chloride in water from Aldrich Chemical Company, Milwaukee, Wis.

"AIBN" refers to 2,2'-Azobis(2-methylpropionitrile), obtained from Aldrich Chemical Company, Milwaukee, Wis.

"DADMAC" refers to diallyl-dimethyl ammonium chloride, obtained from Aldrich Chemical Company, Milwaukee, Wis.

"$TiO_2$(+)" refers to cationic anatase titania nanoparticles, 5-15 nm diameter, obtained as a 15 wt % suspension in water from U.S. Research Nanomaterials, Houston, Tex.

"$TiO_2$(−)" refers to anionic anatase titania nanoparticles, <8 nm diameter, obtained as a 0.82 wt % suspension in water from Titan PE, Shanghai, China under the trade designation "X500".

"$SiO_2$", unless otherwise specified, refers to silica nanoparticles (5 nm diameter, ammonium stabilized), obtained from Nalco Company, Naperville, Ill. as a 15 wt % aqueous dispersion under the trade designation "NALCO 2326".

"IPA" refers to 2-propanol, obtained from VWR, West Chester, Pa.

"MeOH" refers to methanol, obtained from VWR, West Chester, Pa.

"HNO$_3$" refers to nitric acid, obtained from VWR, West Chester, Pa.

"PDADMAC" refers to poly(diallyl-dimethyl ammonium chloride), a positively charged polymer with molecular weight 240K, obtained as a 20 wt % solution in water from PolySciences, Inc., Warrington, Pa.

"PAA" refers to poly(acrylic acid), a negatively charged polymer with molecular weight 240K, obtained as a 25 wt % solution in water from from Alfa Aesar, Ward Hill, Mass.

"LIQUINOX®" refers to liquid lab glassware cleaner made by Alconox, Inc., obtained from VWR, West Chester, Pa.

Preparative Example 1 (PE-1)

Preparation of poly(acrylic acid) Containing 10 wt-% of UVA-1, (poly(AA-co-UVA-1))

The copolymer of acrylic acid and UVA-1 was prepared by first placing 3.0 g of UVA-1 in a 250 ml three-necked round bottom flask equipped with a magnetic stirring bar. 27.0 g of acrylic acid was then added followed by 70.0 g of IPA and 0.3 g of AIBN. The mixture was then stirred at room temperature for five minutes. 70.0 g of water was added with stirring. The transparent solution was deoxygenated by purging with three vacuum/nitrogen cycles and finally heated to a temperature of 65° C. under an inert atmosphere of nitrogen. The mixture was stirred at this temperature overnight before being cooled to room temperature. The final formulation contained about 18.6% solids by weight and was translucent in appearance.

Preparative Example 2 (PE-2)

Preparation of poly(methacryloylamino)propyl-trimethylammonium chloride-co-UVA-1) Containing 10 wt-% of UVA-1, (poly(MAPTAC-co-UVA-1))

The copolymer of methacryloylaminopropyl-trimethylammonium chloride and UVA-1 was prepared by first placing 3.0 g of UVA-1 in a 250 ml three-necked round bottom flask equipped with a magnetic stirring bar. 54.0 g of a 50% aqueous solution of methacryloylaminopropyl-trimethylammonium chloride was then added followed by 120.0 g of methanol and 0.3 g AIBN. The mixture was then stirred at room temperature for five minutes. The transparent solution was deoxygenated by purging with three vacuum/nitrogen cycles and finally heated to a temperature of 65° C. under an inert atmosphere of nitrogen. The mixture was stirred at this temperature overnight before being cooled to room temperature. The final formulation contained about 17.8% solids by weight and was a translucent dispersion.

Preparative Example 3 (PE-3)

Preparation of poly((methacryloylamino)propyl-trimethylammonium chloride-co-HALS-1) Containing 10 wt-% of HALS-1, (poly(MAPTAC-co-HALS-1))

The copolymer of methacryloylaminopropyl-trimethylammonium chloride and HALS-1 was prepared by first placing 3.0 g of HALS-1 in a 250 ml three-necked round bottom flask equipped with a magnetic stirring bar. 54.0 g of a 50% aqueous solution of methacryloylaminopropyl-trimethylammonium chloride was then added followed by 120.0 g of methanol and 0.3 g AIBN. The mixture was then stirred at room temperature for five minutes. The transparent solution was deoxygenated by purging with three vacuum/nitrogen cycles and finally heated to a temperature of 65° C. under an inert atmosphere of nitrogen. The mixture was stirred at this temperature overnight before being cooled to room temperature. The final formulation contained about 18.2 wt % solids by weight and was a translucent dispersion.

Method for Determining the pH of the Coating Solutions

The pH of the solutions used for coating was determined using a VWR sympHony® rugged bulb pH electrode connected to a VWR sympHony® pH meter. Standard buffer solutions were used for calibration.

Method for Determining the Thickness and Refractive Index of Coatings

The thickness and refractive index of layer-by-layer self-assembled coatings were measured using a variable angle spectroscopic ellipsometer (M-2000VI®, J. A. Woollam Co., Inc., Lincoln, Nebr.). The coatings used for these measurements were deposited on glass slides as substrates. Prior to thickness measurements, the coatings were removed from the backside of the substrates with a razor blade. Scotch® Magic™ Tape (3M Company, St. Paul, Minn.) with matte finish was applied to the backside of the substrates in order to suppress backside reflections. Ellipsometric data were acquired from 370-1690 nm at incident angles of 50°, 60°, and 70°. The optical model used to describe the sample consisted of a Cauchy layer for the glass slide substrate and a separate Cauchy layer for the layer-by-layer self-assembled coating. In some cases, a surface roughness layer was added to the optical model to improve the fit to the data. The roughness layer consists of 50% of the underlying Cauchy material and 50% air (refractive index=1.00). Thickness values are reported as an average of measurements at three different locations on the sample plus or minus one standard deviation.

Method for Determining UV and Visible Transmittance of Coatings

The UV and visible transmittance of coatings on glass or quartz slides were measured with a LAMBDA 1050 UV/Vis/NIR spectrometer with an integrating sphere (obtained from Perkin Elmer, Inc. Waltham, Mass.). Transmission values are reported for coatings present on both sides of the substrate.

General Method for Preparing Coatings

Layer-by-layer self-assembled coatings were made using a StratoSequence VI (nanoStrata Inc., Tallahassee, Fla.) dip coating robot. Glass microscope slides (VWR, West Chester, Pa.) and quartz slides (ChemGlass Life Sciences, Vineland, N.J.) were cleaned by sonication in a 1% LIQUINOX® soap solution in water using a bath sonicator (Branson 3510 available from Process Equipment and Supply Company, Cleveland, Ohio) for 15 min. Next, they were rinsed with deionized (DI) water and sonicated two times for 15 min each.

To start the coating process, the glass microscope slides or quartz slides were first immersed in a 0.1 wt % aqueous solution of PDADMAC for at least 10 min. The slides were rinsed thoroughly with DI water to remove weakly bound polymer. The substrates, which were now positively charged after adsorption of roughly a monolayer of PDADMAC, were then alternately dipped in solutions of a polyanion (e.g. PAA) for 1 min and a polycation (e.g. PDADMAC) for 1 min with three rinse steps of 30 sec duration after each charged polymer or nanoparticle solution/suspension. The substrates were rotated at ~90 rpm in each coating and rinse solution. After the desired number of coating cycles, coatings were rinsed with DI water and dried under a stream of nitrogen gas.

The coatings are generally denoted as (Polycation/Polyanion)$_n$ or Polycation(Polyanion/Polycation)$_n$ where n is the number of deposited "bi-layers". A "bi-layer" refers to the combination of a polycation layer and a polyanion layer. A polycation layer can comprise polycationic polymers or nanoparticles. Similarly, a polyanion layer can comprise polyanionic polymers or nanoparticles.

Comparative Examples 1-3 (CE-1, CE-2, CE-3)

Preparation and Characterization of (PDADMAC/PAA)$_n$

In this example, neither the polycation nor the polyanion contains a UVA. PDADMAC was diluted from 20 wt % in water to 0.1 wt % with DI water in a volume of 140 mL. The pH was measured to be ~4.5. PAA was diluted from 25 wt % in water to 0.1 wt % with DI water in a volume of 140 mL. The pH was measured to be ~3.5. The rinse water was DI water with no pH adjustment (pH~5-6). Coatings with 10 (CE-1), 20 (CE-2), and 30 (CE-3) bilayers were subsequently made using a StratoSequence VI dip coating robot as described above. Coating thickness as well as average transmission in the UV range (290-400 nm) and visible range (400-700 nm) are reported in Table 1 below.

Comparative Example 4-6 (CE-4, CE-5, CE-6))

Preparation and Characterization of PDADMAC(PAA/TiO$_2$(+))$_2$

In this example, the polycation is a metal oxide nanoparticle (i.e., anatase TiO$_2$) and the polyanion is PAA. Since TiO$_2$ is an inorganic UV absorber, these coatings will have UV absorption contribution from the TiO$_2$. PAA was diluted from 25 wt % in water to 0.1 wt % with DI water in a volume of 140 mL. The pH was measured to be ~3.5 and was adjusted down to 3.0 with HNO$_3$. TiO$_2$(+) at 15 wt % in water and was diluted to 0.1 wt % with DI water in a volume of 140 mL. The pH was measured to be ~3.5 and was adjusted down to 3.0 with HNO$_3$. The rinse water was DI water with pH adjusted to 3.0 with HNO$_3$. Coatings with 10 (CE-4), 20 (CE-5), and 30 (CE-6) bilayers were subsequently made using a StratoSequence VI dip coating robot as described above. Coating thickness as well as average transmission in the UV range (290-400 nm) and visible range (400-700 nm) are reported in Table 1 below.

Example 1-3

Preparation and Characterization of (PDADMAC/poly(AA-co-UVA-1)$_n$

In this example, the polycation does not contain a UVA, while the polyanion does contain an organic UVA (UVA-1). PDADMAC was diluted from 20 wt % in water to 0.1 wt % with DI water in a volume of 140 mL. The pH was measured to be ~4.5. Poly(AA-co-UVA-1) was diluted from 18.6 wt % in IPA to 0.1 wt % with DI water in a volume of 140 mL, stirred overnight, and vacuum filtered through a 0.2 µm polyethersulfone (PES) filter membrane to give a clear, transparent solution. The pH was measured to be ~3.5. The rinse water was DI water with no pH adjustment (pH ~5-6). Coatings with 10 (EX1), 20 (EX2), and 30 (EX3) bilayers were subsequently made on glass slides using a StratoSequence VI dip coating robot as described above. Coating thickness as well as average transmission in the UV range (290-400 nm) and visible range (400-700 nm) are reported in Table 1 below.

Example 4-6

Preparation and Characterization of PDADMAC (PAA/poly(MAPTAC-co-UVA-1))$_n$

In this example, the polycation contains an organic UVA (UVA-1), but the polyanion does not contain a UVA. PAA was diluted from 25 wt % in water to 0.1 wt % with DI water in a volume of 140 mL. The pH was measured to be ~3.5. poly(MAPTAC-co-UVA-1) was a translucent dispersion at 17.8 wt % in MeOH and was diluted to 0.1 wt % with DI water in a volume of 140 mL and stirred overnight to give a translucent suspension. The pH was measured to be ~4.5. The rinse water was DI water with no pH adjustment (pH~5-6). Coatings with 10 (EX4), 20 (EX5), and 30 (EX6) bilayers were subsequently made using a StratoSequence VI dip coating robot as described above. Coating thickness as well as average transmission in the UV range (290-400 nm) and visible range (400-700 nm) are reported in Table 1 below.

Example 7-9

Preparation and Characterization of PDADMAC (poly(AA-co-UVA-1)/poly(MAPTAC-co-UVA-1))$_n$ In this example, the polycation and polyanion both contain an organic UVA (UVA-1). Poly(AA-co-UVA-1) was diluted from 18.6 wt % in IPA to 0.1 wt % with DI water in a volume of 140 mL, stirred overnight, and vacuum filtered through a 0.2 µm polyethersulfone (PES) filter membrane to give a clear, transparent solution. The pH was measured to be ~3.5. poly(MAPTAC-co-UVA-1)) was a translucent dispersion at 17.8 wt % in MeOH and was diluted to 0.1 wt % with DI water in a volume of 140 mL and stirred overnight to give a translucent suspension. The pH was measured to be ~4.5. The rinse water was DI water with no pH adjustment (pH ~5-6). Coatings with 10 (EX7), 20 (EX8), and 30 (EX9) bilayers were subsequently made using a StratoSequence VI dip coating robot as described above. Coating thickness as well as average transmission in the UV range (290-400 nm) and visible range (400-700 nm) are reported in Table 1 below.

Example 10-12

Preparation and Characterization of PDADMAC(poly(AA-co-UVA-1)/TiO$_2$ (+))$_n$

In this example, the polycation is a metal oxide nanoparticle (i.e., anatase TiO$_2$) and the polyanion contains an organic UVA (UVA-1). TiO$_2$ is also an inorganic UV absorber, and thus these coatings will have UV absorption contribution from both the TiO$_2$ and UVA-1.

Poly(AA-co-UVA-1) was diluted from 18.6 wt % in IPA to 0.1 wt % with DI water in a volume of 140 mL, stirred overnight, and vacuum filtered through a 0.2 µm polyethersulfone (PES) filter membrane to give a clear, transparent solution. The pH was measured to be ~3.5 and was adjusted down to 3.0 with $HNO_3$. $TiO_2(+)$ at 15 wt % in water and was diluted to 0.1 wt % with DI water in a volume of 140 mL and stirred for 1 hr. The pH was measured to be ~3.5 and was adjusted down to 3.0 with $HNO_3$. The rinse water was DI water with pH adjusted to 3.0 with $HNO_3$. Coatings with 10 (EX10), 20 (EX11), and 30 (EX12) bilayers were subsequently made using a StratoSequence VI dip coating robot as described above. Coating thickness as well as average transmission in the UV range (290-400 nm) and visible range (400-700 nm) are reported in Table 1 below.

Comparative Example 7 (CE-7)

This comparative example is a 2 mil thick PET available from 3M Company, St. Paul, Minn.

Example 13 (EX13)

Preparation and Characterization of (PDADMAC/poly(AA-co-UVA-1))$_{30}$ on a PET Film Substrate This example has the same coating formulation as Example 3; however, the coating is deposited on PET film (i.e. an organic substrate) instead of a glass slide.

In this example, the polycation does not contain a UVA, while the polyanion does contain an organic UVA (UVA-1). PDADMAC was diluted from 20 wt % in water to 0.1 wt % with DI water in a volume of 140 mL. The pH was measured to be ~4.5. Poly(AA-co-UVA-1) was diluted from 18.6 wt % in IPA to 0.1 wt % with DI water in a volume of 140 mL, stirred overnight, and vacuum filtered through a 0.2 μm polyethersulfone (PES) filter membrane to give a clear, transparent solution. The pH was measured to be ~3.5. The rinse water was DI water with no pH adjustment (pH ~5-6). The substrate was a piece of 2 mil thick PET available from 3M Company, St. Paul, Minn. The PET was rinsed with IPA followed by DI $H_2O$ and then dried under a stream of nitrogen gas. Next, the PET was subjected on both sides to air corona treatment using a BD-20AC Laboratory Corona Treater (obtained from Electro-Technic Products, Inc., Chicago, Ill.) for approximately 30 seconds per side to impart a slight negative charge to the substrate and improve wetting of the aqueous coating solutions. A coating with 30 bilayers (EX13) was deposited on the PET using a StratoSequence VI dip coating robot as described above.

Average transmission in the UV range (290-400 nm) and visible range (400-700 nm) are reported in Table 1 below.

TABLE 1

Summary of coating thickness, average UV transmission, and average visible transmission for Comparative Examples 1-7 and Examples 1-13.

| Sample | Polycation | Polyanion | # of bilayers | Coating Thickness (nm) | Avg % T (290-400 nm) | Avg % T (400-700 nm) |
|---|---|---|---|---|---|---|
| CE-1 | PDADMAC | PAA | 10 | 189 ± 8 | 78.7 | 91.5 |
| CE-2 | PDADMAC | PAA | 20 | 398 ± 11 | 77.1 | 91.6 |
| CE-3 | PDADMAC | PAA | 30 | 655 ± 12 | 77.9 | 91.5 |
| EX1 | PDADMAC | poly(AA-co-UVA-1) | 10 | 135 ± 4 | 67.5 | 92.1 |
| EX2 | PDADMAC | poly(AA-co-UVA-1) | 20 | 323 ± 12 | 56.1 | 91.4 |
| EX3 | PDADMAC | poly(AA-co-UVA-1) | 30 | 955 ± 70 | 40.6 | 91.5 |
| EX4 | poly(MAPTAC-co-UVA-1) | PAA | 10 | 458 ± 23 | 65.5 | 91.5 |
| EX5 | poly(MAPTAC-co-UVA-1) | PAA | 20 | 839 ± 24 | 54.4 | 91.5 |
| EX6 | poly(MAPTAC-co-UVA-1) | PAA | 30 | 2620 ± 390 | 35.6 | 91.4 |
| EX7 | poly(MAPTAC-co-UVA-1) | poly(AA-co-UVA-1) | 10 | 255 ± 6 | 52.7 | 91.2 |
| EX8 | poly(MAPTAC-co-UVA-1) | poly(AA-co-UVA-1) | 20 | 493 ± 14 | 38.7 | 91.1 |
| EX9 | poly(MAPTAC-co-UVA-1) | poly(AA-co-UVA-1) | 30 | 755 ± 20 | 30.4 | 91.1 |
| CE-4 | $TiO_2$ (+) | PAA | 10 | 34 ± 1 | 76.6 | 84.2 |
| CE-5 | $TiO_2$ (+) | PAA | 20 | 54 ± 2 | 61.6 | 78.8 |
| CE-6 | $TiO_2$ (+) | PAA | 30 | 73 ± 1 | 61.2 | 84.3 |
| EX10 | $TiO_2$ (+) | poly(AA-co-UVA-1) | 10 | 31 ± 1 | 64.5 | 88.0 |
| EX11 | $TiO_2$ (+) | poly(AA-co-UVA-1) | 20 | 70 ± 1 | 57.7 | 78.1 |
| EX12 | $TiO_2$ (+) | poly(AA-co-UVA-1) | 30 | 96 ± 2 | 56.5 | 80.5 |
| CE-7 (PET film) | None | None | 0 | N/A | 61.0 | 87.5 |
| EX13 | PDADMAC | poly(AA-co-UVA-1) | 30 |  | 38.4 | 90.3 |

Examples 1-13 can be coated on a substrate comprising an organic material in the same or similar manner as Example 1. The transmission properties of other light transmissive substrates would be the same or similar to the properties on glass.

Example 14

Preparation and Characterization of PDADMAC $(TiO_2 (-)/poly(MAPTAC-co-HALS))_n$ In this example, the polyanion is a metal oxide nanoparticle (i.e., anatase $TiO_2$) and the polycation contains an organic light stabilizing agent (i.e., a hindered amine light stabilizer (HALS)).

Poly(MAPTAC-co-HALS-1) was diluted from 18.2 wt % in methanol to 0.1 wt % with DI water in a volume of 140 mL, stirred overnight, and vacuum filtered through a 0.2 μm polyethersulfone (PES) filter membrane to give a clear, transparent solution. The pH was adjusted to 10.0 with NaOH. $TiO_2(-)$ at 0.82 wt % (available from TitanPE, Shanghai, China under the trade designation "X500") was used undiluted. The pH was measured to be ~9.7 and was not adjusted. The rinse water was DI water with pH adjusted to 10.0 with NaOH. A coating with 15 bilayers was made using a StratoSequence VI dip coating robot as described above. The coating thickness was measured to be approximately 98 nm with 8 nm of surface roughness and the coating refractive index was measured to be approximately 1.77 at a wavelength of 633 nm using the "Method for Determining the Thickness and Refractive Index of Coatings" above.

Example 15

Preparation of a UV Reflective Coating Containing UV Absorbers and/or HALS

Multi-stack optical coatings can be made to selectively reflect desired wavelengths of light. Multi-stack optical coatings comprise alternating high index stacks (denoted as "H") and low index stacks (denoted as "L").

High index stacks can be deposited using $TiO_2$ as either the polyanion or polycation. In one embodiment, the high index stacks comprise multiple bi-layers denoted as $(TiO_2 (+)/poly(AA-co-UVA-1))_n$. In another embodiment, the high index stacks comprise multiple bilayers denoted as $(poly(MAPTAC-co-HALS-1)/TiO_2(-))_n$. The number of bi-layers n would be chosen so that the optical thickness of the stack (i.e. the physical thickness multiplied by the refractive index) is roughly $1/4^{th}$ of the desired wavelength to be reflected.

Low index stacks can be deposited using $SiO_2$ as the polyanion. In one embodiment, the low index stacks comprise multiple bi-layers denoted as $(poly(MAPTAC-co-UVA-1)/SiO_2)_n$. In another embodiment, the low index stacks comprise multiple bilayers denoted as $(poly(MAPTAC-co-HALS-1)/SiO_2)_n$. The number of bi-layers n would be chosen so that the optical thickness of the stack (i.e. the physical thickness multiplied by the refractive index) is roughly $1/4^{th}$ of the desired wavelength to be reflected.

For a UV reflective coating, the coating should reflect light in the bandwidth of 290-400 nm Therefore, the optical thickness of both the low and high index stacks would be in the range of 72.5 to 100 nm.

Example 16

Preparation of a Blue Light Reflective Coating Containing UV Absorbers and/or HALS Multi-stack optical coatings can be made to selectively reflect desired wavelengths of light. Multi-stack optical coatings comprise alternating high-index stacks (denoted as "H") and low-index stacks (denoted as "L").

High index stacks can be deposited using $TiO_2$ as either the polyanion or polycation. In one embodiment, the high index stacks comprise multiple bi-layers denoted as $(TiO_2 (+)/poly(AA-co-UVA-1))_n$. In another embodiment, the high index stacks comprise multiple bi-layers denoted as $(poly(MAPTAC-co-HALS-1)/TiO_2(-))_n$. The number of bi-layers n would be chosen so that the optical thickness of the stack (i.e. the physical thickness multiplied by the refractive index) is roughly $1/4^{th}$ of the desired wavelength to be reflected.

Low index stacks can be deposited using $SiO_2$ as the polyanion. In one embodiment, the low index stacks comprise multiple bi-layers denoted as $(poly(MAPTAC-co-UVA-1)/SiO_2)_n$. In another embodiment, the low index stacks comprise multiple bi-layers denoted as $(poly(MAPTAC-co-HALS-1)/SiO_2)_n$. The number of bi-layers n would be chosen so that the optical thickness of the stack (i.e. the physical thickness multiplied by the refractive index) is roughly $1/4^{th}$ of the desired wavelength to be reflected.

For a blue reflective coating, the coating should reflect light in the bandwidth of roughly 400-500 nm. Therefore, the optical thickness of both the low and high index stacks would be in the range of 100 to 125 nm.

Example 17

Preparation of a Near Infrared (NIR) Reflective Coating Containing UV Absorbers and/or HALS Multi-stack optical coatings can be made to selectively reflect desired wavelengths of light. Multi-stack optical coatings comprise alternating high-index stacks (denoted as "H") and low-index stacks (denoted as "L").

High index stacks can be deposited using $TiO_2$ as either the polyanion or polycation. In one embodiment, the high index stacks comprise multiple bi-layers denoted as $(TiO_2 (+)/poly(AA-co-UVA-1))_n$. In another embodiment, the high index stacks comprise multiple bilayers denoted as $(poly(MAPTAC-co-HALS-1)/TiO_2(-))_n$. The number of bi-layers n would be chosen so that the optical thickness of the stack (i.e. the physical thickness multiplied by the refractive index) is roughly $1/4^{th}$ of the desired wavelength to be reflected.

Low index stacks can be deposited using $SiO_2$ as the polyanion. In one embodiment, the low index stacks comprise multiple bi-layers denoted as $(poly(MAPTAC-co-UVA-1)/SiO_2)_n$. In another embodiment, the low index stacks comprise multiple bi-layers denoted as $(poly(MAPTAC-co-HALS-1)/SiO_2)_n$. The number of bi-layers n would be chosen so that the optical thickness of the stack (i.e. the physical thickness multiplied by the refractive index) is roughly $1/4^{th}$ of the desired wavelength to be reflected.

For an NIR reflective coating, the coating should reflect light in the bandwidth of roughly 750-1400 nm. Therefore, the optical thickness of both the low and high index stacks would be in the range of 187.5 to 350 nm.

What is claimed is:

1. A method of protecting a substrate from light-induced degradation comprising:
providing a substrate comprising an organic polymeric material;
disposing onto the substrate a plurality of layers deposited by layer-by-layer self-assembly wherein at least a portion of the layers comprise a polyelectrolyte copolymer of an ionic monomer and a copolymerizable organic light absorbing compound, copolymerizable organic light stabilizing compound, or a combination thereof;
and wherein the organic light stabilizing compound or the organic light absorbing compound comprises a group selected from the group consisting of a hindered amine, benzotriazole, benzophenone, triazine, and mixtures thereof.

2. A method of protecting a substrate from light-induced degradation comprising:
providing a substrate;
disposing onto the substrate a plurality of alternating layers of a polyelectrolyte and inorganic oxide nanoparticles deposited by layer-by-layer self-assembly wherein at least a portion of the layers comprise a polyelectrolyte copolymer of an ionic monomer and a copolymerizable organic light absorbing compound, copolymerizable organic light stabilizing compound, or a combination thereof; and wherein the organic light stabilizing compound or the organic light absorbing compound comprises a group selected from the group consisting of a hindered amine, benzotriazole, benzophenone, triazine, and mixtures thereof.

3. The method of claim 2 wherein the substrate consists of an inorganic material or an organic material.

4. The method of claim 1 wherein the substrate is light-transmissive to visible light.

5. The method of claim 1 wherein the substrate is an inorganic material further comprising a coating comprising an organic polymeric material, the coating disposed between the substrate and plurality of layers deposited by layer-by-layer self-assembly.

6. The method of claim 1 wherein the copolymerizable organic light absorbing or light stabilizing compound comprises a (meth)acryl or vinyl group.

7. The method of claim 1 wherein the ionic monomer comprises a (meth)acryl or vinyl ether group and an ionic group.

8. The method of claim 1 wherein the polyelectrolyte copolymer is a grafted copolymer or a random copolymer.

9. The method of claim 1 wherein the organic light absorbing compound reduces the transmission of ultraviolet light.

10. The method of claim 1 wherein the plurality of layers deposited by layer-by-layer self-assembly further provide a durable top coat or a reduction in surface reflections at 550 nm to less than 2%.

11. The method of claim 1 wherein the substrate is selected from the group consisting of woven or nonwoven fabric, an optical film, architectural film, greenhouse film, window film, protection film, fenestration product, solar light tube film, traffic signage film, commercial graphics film, a solar photovoltaic front-sheet film, and solar power concentrating mirror.

12. The method of claim 11 wherein the optical film is a multilayer film selected from the group consisting of an ultraviolet reflector, a blue-reflector, a visible reflector, an infrared reflector, or a combination thereof.

13. The method of claim 12 wherein the plurality of layers deposited by layer-by-layer self-assembly comprise alternating stacks of low refractive index bi-layers and high refractive index bi-layers that increase the total reflectivity of the multilayer optical film.

14. The method of claim 1 wherein the polyelectrolyte copolymer is provided in an aqueous solvent.

15. An article comprising
a substrate comprising an organic polymeric material;
a plurality of layers deposited by layer-by-layer self-assembly disposed on the substrate, wherein at least a portion of the layers comprise a polyelectrolyte copolymer of an ionic monomer and a copolymerizable organic light absorbing compound, copolymerizable organic light stabilizing compound, or a combination thereof; and
wherein the organic light stabilizing compound or the organic light absorbing compound comprises a group selected from the group consisting of a hindered amine, benzotriazole, benzophenone, triazine, and mixtures thereof.

16. An article comprising
a substrate;
a plurality of alternating layers of a polyelectrolyte and inorganic oxide nanoparticles deposited by layer-by-layer self-assembly disposed on the substrate wherein at least a portion of the layers comprise a polyelectrolyte copolymer of an ionic monomer and a copolymerizable organic light absorbing compound, copolymerizable organic light stabilizing compound, or a combination thereof; and wherein the organic light stabilizing compound or the organic light absorbing compound comprises a group selected from the group consisting of a hindered amine, benzotriazole, benzophenone, triazine, and mixtures thereof.

17. The article of claim 15 wherein the substrate consists of an inorganic material or an organic material.

18. The article of claim 15 wherein the substrate comprises an organic polymeric material.

19. The article of claim 15 wherein the substrate is light-transmissive to visible light.

20. The article of claim 15 wherein the substrate is an inorganic material further comprising a coating comprising an organic polymeric material, the coating disposed between the substrate and plurality of layers deposited by layer-by-layer self-assembly.

21. The article of claim 15 wherein the copolymerizable organic light absorbing or light stabilizing compound comprises a (meth)acryl or vinyl group.

22. The article of claim 15 wherein the ionic monomer comprises a (meth)acryl or vinyl ether group and an ionic group.

23. The article of claim 15 wherein the polyelectrolyte copolymer is a grafted copolymer or a random copolymer.

24. The article of claim 15 wherein the organic light absorbing compound reduces the transmission of ultraviolet light.

25. The article of claim 15 wherein the plurality of layers deposited by layer-by-layer self-assembly further provide a durable top coat or a reduction in surface reflections at 550 nm to less than 2%.

26. The article of claim 15 wherein the substrate is selected from the group consisting of woven or nonwoven fabric, an optical film, architectural film, greenhouse film, window film, protection film, fenestration product, solar light tube film, traffic signage film, commercial graphics film, a solar photovoltaic front-sheet film, and solar power concentrating mirror.

27. The article of claim 15 wherein the optical film is a multilayer film selected from the group consisting of an ultraviolet reflector, a blue-reflector, a visible reflector, an infared reflector, or a combination thereof.

28. The article of claim 15 wherein the plurality of layers deposited by layer-by-layer self-assembly comprise alternating stacks of low refractive index bi-layers and high refractive index bi-layers that increase the total reflectivity of the multilayer optical film.

* * * * *

UNITED STATES PATENT AND TRADEMARK OFFICE
CERTIFICATE OF CORRECTION

PATENT NO. : 9,902,869 B2
APPLICATION NO. : 14/782125
DATED : February 27, 2018
INVENTOR(S) : Daniel Schmidt et al.

It is certified that error appears in the above-identified patent and that said Letters Patent is hereby corrected as shown below:

Column 1
Line 13 (approx.), delete "properties" and insert -- properties. --, therefor.

Column 4
Line 28, delete "napthalate)," and insert -- naphthalate), --, therefor.

Column 7
Line 32-33 (approx.), delete "poly(vinylbenzyltriamethylamine)," and insert
-- poly(vinylbenzyltrimethylamine), --, therefor.

Column 8
Line 14 (approx.), delete "amiobenzoates." and insert -- aminobenzoates. --, therefor.
Line 36, delete "heteratom" and insert -- heteroatom --, therefor.
Line 36, delete "N." and insert -- N, --, therefor.

Column 9
Line 14 (approx.), delete "Inc" and insert -- Inc. --, therefor.
Line 44, after ""NORBLOC 7966"" insert -- . --.
Line 66, delete "Traizines" and insert -- Triazines --, therefor.

Column 11
Line 38, delete "pyrridine," and insert -- pyridine, --, therefor.

Column 16
Line 48, delete "77 nm" and insert -- 77 nm. --, therefor.

Column 17
Line 43, delete "al.)" and insert -- al.). --, therefor.
Line 57, delete "embodiments,the" and insert -- embodiments, the --, therefor.

Signed and Sealed this
Twenty-fifth Day of September, 2018

Andrei Iancu
*Director of the United States Patent and Trademark Office*

Column 18
Line 10, delete "nm" and insert -- nm. --, therefor.

Column 21
Line 53, delete "infared" and insert -- infrared --, therefor.

Column 23
Line 16, delete "tetrafluoroethyelene" and insert -- tetrafluoroethylene --, therefor.

Column 27
Line 15, delete "from from" and insert -- from --, therefor.

Column 29
Line 36, delete "$(+))_2$" and insert -- $(+))_n$ --, therefor.

Column 33
Line 65, delete "nm" and insert -- nm. --, therefor.

Column 37
Line 7, in Claim 27, delete "infared" and insert -- infrared --, therefor.